US012460472B2

(12) United States Patent
Goldfinch et al.

(10) Patent No.: US 12,460,472 B2
(45) **Date of Patent: *Nov. 4, 2025**

(54) TOP-HANGING SLIDING DOOR INCLUDING WEDGE DESIGN TOP SEAL

(71) Applicant: AD Solutions, Inc., Carmel, IN (US)

(72) Inventors: Gregory J. Goldfinch, Everett, WA (US); Robert Allen Larson, Jr., Everett, WA (US); Dustin Dale Swartz, Bothell, WA (US)

(73) Assignee: AD Solutions, Inc., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,282

(22) Filed: Feb. 9, 2022

(65) Prior Publication Data

US 2023/0124813 A1 Apr. 20, 2023

Related U.S. Application Data

(63) Continuation of application No. 16/500,344, filed as application No. PCT/US2018/022473 on Mar. 14, 2018, now Pat. No. 11,280,130.

(Continued)

(51) Int. Cl.
*E06B 7/23* (2006.01)
*E05D 15/06* (2006.01)
(Continued)

(52) U.S. Cl.
CPC ........ *E06B 7/2307* (2013.01); *E05D 15/0652* (2013.01); *E06B 3/4627* (2013.01);
(Continued)

(58) Field of Classification Search
CPC ...... E06B 7/2307; E06B 7/2309; E06B 7/231; E06B 3/4627; E06B 3/4645
(Continued)

(56) References Cited

U.S. PATENT DOCUMENTS 2,009,720 A 7/1935 Warrington
2,878,532 A 3/1959 Clark
(Continued)

FOREIGN PATENT DOCUMENTS

DE 202014009250 U1 * 1/2015 ......... E06B 3/26305

OTHER PUBLICATIONS

International Search Report and Written Opinion, mailed Jun. 7, 2018, for International Patent Application No. PCT/US2018/022473. (12 pages).

*Primary Examiner* — Marcus Menezes
(74) *Attorney, Agent, or Firm* — Seed Intellectual Property Law Group LLP

(57) ABSTRACT

Systems and methods for providing a door seal system for top-hanging sliding doors. In some implementations, two angled mating surfaces are used, one angled surface on a fixed frame and one reversed angled surface on the slideable door panel. The slideable door panel slides directly parallel to the fixed door frame. A mating seal surface is created that is only in frictional contact for a small portion of the linear slide distance of the door panel. In some implementations, rather than placing two opposing angled seal surfaces, the sealing system has one angled surface on the fixed door frame. In such implementations, the sliding door panel is adjusted to be in a reverse angled orientation relative to the angled surface of the fixed door frame. Seal designs for the rear vertical edge of the slideable door panel are also provided herein.

28 Claims, 36 Drawing Sheets

Related U.S. Application Data

(60) Provisional application No. 62/480,946, filed on Apr. 3, 2017.

(51) Int. Cl.
*E06B 3/46* (2006.01)
*E06B 7/215* (2006.01)

(52) U.S. Cl.
CPC ............ *E06B 3/4645* (2013.01); *E06B 7/215* (2013.01); *E05Y 2600/14* (2013.01); *E05Y 2600/31* (2013.01); *E05Y 2800/12* (2013.01); *E05Y 2800/678* (2013.01); *E05Y 2900/132* (2013.01); *E06B 7/2314* (2013.01)

(58) Field of Classification Search
USPC .................................................... 49/208–210
See application file for complete search history.

(56) References Cited

U.S. PATENT DOCUMENTS

| | | | | | |
|---|---|---|---|---|---|
| 3,475,860 | A | * | 11/1969 | Stanley | E06B 3/4672 49/129 |
| 3,611,637 | A | | 10/1971 | Saino | |
| 4,056,211 | A | * | 11/1977 | Zumwalt | F25D 23/066 49/501 |
| 4,509,999 | A | * | 4/1985 | Sandor | E06B 7/231 428/41.3 |
| 5,280,686 | A | | 1/1994 | Davies | |
| 5,577,348 | A | | 11/1996 | Keller | |
| 5,630,294 | A | * | 5/1997 | Bruno | E05D 15/1021 49/410 |
| 6,216,392 | B1 | | 4/2001 | DiGinosa | |
| 6,442,900 | B1 | | 9/2002 | Kvasnes | |
| 6,826,867 | B1 | | 12/2004 | McDonald et al. | |
| 6,973,753 | B2 | | 12/2005 | Liebscher | |
| 7,395,631 | B2 | | 7/2008 | Lahnala | |
| 7,610,718 | B2 | * | 11/2009 | Kopish | E05D 15/1042 49/211 |
| 7,743,557 | B2 | | 6/2010 | Liao | |
| 8,375,645 | B2 | | 2/2013 | Iwauchi et al. | |
| 8,381,444 | B1 | * | 2/2013 | McDonald | E06B 7/26 49/411 |
| 10,011,159 | B1 | * | 7/2018 | Salter | B60J 1/1853 |
| 11,280,130 | B2 | * | 3/2022 | Goldfinch | E06B 7/215 |
| 2002/0017060 | A1 | * | 2/2002 | Kern | F25D 23/021 49/231 |
| 2004/0107642 | A1 | * | 6/2004 | Liebscher | E06B 7/2307 49/141 |
| 2010/0242370 | A1 | | 9/2010 | Trulaske, Sr. | |
| 2019/0264484 | A1 | * | 8/2019 | Tuminella | E05D 15/0652 |

* cited by examiner

TOP-HANGING SLIDING DOOR INCLUDING WEDGE DESIGN TOP SEAL

BACKGROUND

Technical Field

The present disclosure generally relates to sliding doors, and more particularly, to top-hanging sliding doors that include acoustic seals.

Description of the Related Art

In various environments, sliding doors may be used to provide space savings and other benefits. Such environments may include medical clinics, hospital exam rooms, toilet rooms or restrooms, corporate office settings, etc., where in particular the space savings and other functionality of sliding doors may be desired. Some sliding doors may be "top-hanging" on a door frame with no exposed floor track and may be designed to roll on a track positioned at the top of the door frame. In some environments, it may be desirable to provide sliding doors which have a relatively low sound transmission to provide enhanced privacy and noise reduction between the two areas which are separated by a sliding door. To date, perimeter gaps inherent in sliding doors have presented considerable challenges for acoustic transmission performance in sliding doors.

BRIEF SUMMARY

A door seal system for a top-hanging sliding door, the top-hanging sliding door including a door frame which supports a door panel that is slideable along a track between an open position and a closed position, may be summarized as including: a frame wedge surface which faces outward from a top portion of the door frame toward the door panel, the frame wedge surface positioned to at least substantially horizontally align with a width of the door panel when the door panel is in the closed position, the frame wedge surface planar in shape and extending outward toward the door panel a first distance proximate a leading edge of the door and extending outward toward the door panel a second distance proximate a trailing edge of the door, the first distance greater than the second distance, such that the frame wedge surface extends at a non-zero angle with respect to a track axis of the track; and a door wedge surface which extends outward from a top portion of the door panel toward the frame wedge surface, the door wedge surface at least substantially parallel to the frame wedge surface such that as the door panel is moved from the open position to the closed position the door wedge surface engages the frame wedge surface to provide a seal therebetween.

The door panel may be hung at a non-zero angle with respect to the track axis of the track. The door panel may be hung at an angle with respect to the track axis of the track that is between 0.1 degrees and 4.0 degrees. The frame wedge surface may extend at an angle with respect to the track axis of the track that is between 0.1 degrees and 4.0 degrees. The door wedge surface may include a door wedge coupled to a top portion of the door panel, the door wedge surface extending outward from a top portion of the door panel toward the frame wedge surface a third distance proximate a leading edge of the door and extending outward toward the door panel a fourth distance proximate a trailing edge of the door, the fourth distance greater than the third distance, such that the frame wedge surface extends at a non-zero angle with respect to the track axis of the track. At least one of the frame wedge surface and the door wedge surface may include a friction-reducing material thereon. The door wedge surface may include a door wedge selectively coupled to a top portion of the door panel, the door wedge including a pivot hole proximate the leading edge of the door panel and an angle adjustment slot proximate the trailing edge of the door panel. The door wedge may be selectively coupleable to the top portion of the door panel via first and second fasteners that are insertable into the door panel through the pivot hole and the angle adjustment slot, respectively. At least one of the frame wedge surface and the door wedge surface may include a compressive seal thereon. The door seal system may further include: a rear seal coupled along a rear side of the door panel facing the door frame, the rear seal extending between a bottom of the door panel and the top of the door panel, as the door panel is moved from the open position to the closed position the rear seal engages the door frame to provide a seal therebetween. The rear seal may be coupled to the rear side of the door panel via an adhesive. The rear seal may be coupled to a retainer which is coupled to the rear side of the door panel. The rear seal may include at least one of an extruded elastomeric compound. The rear seal may be relatively narrow toward a front edge relatively proximate the leading edge of the door panel and may be relatively wide toward a rear edge relatively distal the leading edge of the door panel. At least a portion of the rear seal may include a friction-reducing surface. The door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The door seal system may further include: a first rear seal coupled along a rear side of the door panel facing the door frame, the first rear seal extending between a bottom of the door panel and the top of the door panel; and a second rear seal coupled along a front side of the door frame facing the door panel, the second rear seal extending between a bottom of the door frame and the top of the door frame, wherein as the door panel is moved from the open position to the closed position the first rear seal engages the second rear seal to provide a seal therebetween. The first rear seal and the second rear seal may have a substantially identical cross-section. The first rear seal may be relatively narrow toward a front edge relatively proximate the leading edge of the door panel and may be relatively wide toward a rear edge relatively distal the leading edge of the door panel, and the second rear seal may be relatively wide toward a front edge relatively proximate the leading edge of the door panel and may be relatively narrow toward a rear edge relatively distal the leading edge of the door panel. The first rear seal and second rear seal may include respective ramped surfaces which engage each other to provide a seal therebetween. The door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The carriage of the drop seal assembly may include a fixed pin, and the drop seal assembly may further include an elongated guide bar which is fixed relative to the door panel, the guide bar may include an angled slot therein which receives the fixed pin of the carriage, and the fixed pin may ride in the angled slot responsive to the horizontal force imparted on the carriage by the drop seal assembly activator to control movement of the carriage between the raised position and the lowered position. The drop seal assembly may further include at least one spring coupled between the elongated guide bar and the carriage, the at least one spring biases the carriage in the raised position. The angled slot of the elongated guide bar may be disposed at an angle that is between 30 degrees and 45 degrees with respect to horizontal. The drop seal assembly may further include a bearing coupled to the carriage proximate a trailing end of the door panel, and the drop seal assembly activator may include a sill guide which has a bearing surface which contacts the bearing when the door panel is moved from the open position to the closed position. The horizontal position of the bearing surface of the sill guide may be selectively adjustable and the horizontal position of the bearing surface of the sill guide may control the height of the carriage when the carriage is in the lowered position. The drop seal assembly activator may be self-adjusting to cause the elastic seal to contact the floor surface below the door panel when the door panel is in the closed position when the floor surface is spaced apart from the bottom portion of the door panel by any distance within a determined range of distances. The drop seal assembly may include a first magnet coupled to a leading end of the carriage, and the drop seal assembly activator may include a second magnet coupled to the door frame, and when the door panel is moved from the open position toward the closed position the second magnet may repel the first magnet which imparts the horizontal force to the carriage of the drop seal assembly to cause the carriage to move from the raised position to the lowered position. The door panel may be in the closed position, the first magnet is spaced apart from the second magnet by an air gap.

A top-hanging sliding door may be summarized as including: a door frame; a door panel supported by the door frame, the door panel slideable between an open position and a closed position; and a door seal system comprising: a frame wedge surface which faces outward from a top portion of the door frame toward the door panel, the frame wedge surface positioned to at least substantially horizontally align with a width of the door panel when the door panel is in the closed position, the frame wedge surface planar in shape and extending outward toward the door panel a first distance proximate a leading edge of the door and extending outward toward the door panel a second distance proximate a trailing edge of the door, the first distance greater than the second distance, such that the frame wedge surface extends at a non-zero angle with respect to a track axis of the track; and a door wedge surface which extends outward from a top portion of the door panel toward the frame wedge surface, the door wedge surface at least substantially parallel to the frame wedge surface such that as the door panel is moved from the open position to the closed position the door wedge surface engages the frame wedge surface to provide a seal therebetween.

The door panel may be hung at a non-zero angle with respect to the track axis of the track. The door panel may be hung at an angle with respect to the track axis of the track that is between 0.1 degrees and 4.0 degrees. The frame wedge surface may extend at an angle with respect to the track axis of the track that is between 0.1 degrees and 4.0 degrees. The door wedge surface may include a door wedge coupled to a top portion of the door panel, the door wedge surface extending outward from a top portion of the door panel toward the frame wedge surface a third distance proximate a leading edge of the door and extending outward toward the door panel a fourth distance proximate a trailing edge of the door, the fourth distance greater than the third distance, such that the frame wedge surface extends at a non-zero angle with respect to the track axis of the track. At least one of the frame wedge surface and the door wedge surface may include a friction-reducing material thereon. The door wedge surface may include a door wedge selectively coupled to a top portion of the door panel, the door wedge including a pivot hole proximate the leading edge of the door panel and an angle adjustment slot proximate the trailing edge of the door panel. The door wedge may be selectively coupleable to the top portion of the door panel via first and second fasteners that are insertable into the door panel through the pivot hole and the angle adjustment slot, respectively. At least one of the frame wedge surface and the door wedge surface may include a compressive seal thereon. The top-hanging sliding door may further include: a rear seal coupled along a rear side of the door panel facing the door frame, the rear seal extending between a bottom of the door panel and the top of the door panel, as the door panel is moved from the open position to the closed position the rear seal engages the door frame to provide a seal therebetween. The rear seal may be coupled to the rear side of the door panel via an adhesive. The rear seal may be coupled to a retainer which is coupled to the rear side of the door panel.

The rear seal may include at least one of an extruded elastomeric compound. The rear seal may be relatively narrow toward a front edge relatively proximate the leading edge of the door panel and may be relatively wide toward a rear edge relatively distal the leading edge of the door panel. At least a portion of the rear seal may include a friction-reducing surface. The door panel may include a bottom portion having a downward facing opening therein, the door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The top-hanging sliding door may further include: a first rear seal coupled along a rear side of the door panel facing the door frame, the first rear seal extending between a bottom of the door panel and the top of the door panel; and a second rear seal coupled along a front side of the door frame facing the door panel, the second rear seal extending between a bottom of the door frame and the top of the door frame, wherein as the door panel is moved from the open position to the closed position the first rear seal engages the second rear seal to provide a seal therebetween. The first rear seal and the second rear seal may have a substantially identical cross-section. The first rear seal may be relatively narrow toward a front edge relatively proximate the leading edge of the door panel and may be relatively wide toward a rear edge relatively distal the leading edge of the door panel, and the second rear seal may be relatively wide toward a front edge relatively proximate the leading edge of the door panel and may be relatively narrow toward a rear edge relatively distal the leading edge of the door panel. The first rear seal and second rear seal may include respective ramped surfaces which engage each other to provide a seal therebetween. The door panel may include a bottom portion having a downward facing opening therein, the door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The door panel may include a bottom portion having a downward facing opening therein, the door seal system may further include: a drop seal assembly physically coupled to a bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position. The carriage of the drop seal assembly may include a fixed pin, and the drop seal assembly may further include an elongated guide bar which is fixed relative to the door panel, the guide bar includes an angled slot therein which receives the fixed pin of the carriage, and the fixed pin rides in the angled slot responsive to the horizontal force imparted on the carriage by the drop seal assembly activator to control movement of the carriage between the raised position and the lowered position. The drop seal assembly may further include at least one spring coupled between the elongated guide bar and the carriage, the at least one spring biases the carriage in the raised position. The angled slot of the elongated guide bar may be disposed at an angle that is between 30 degrees and 45 degrees with respect to horizontal. The drop seal assembly may further include a bearing coupled to the carriage proximate a trailing end of the door panel, and the drop seal assembly activator may include a sill guide which has a bearing surface which contacts the bearing when the door panel is moved from the open position to the closed position. The horizontal position of the bearing surface of the sill guide may be selectively adjustable and the horizontal position of the bearing surface of the sill guide may control the height of the carriage when the carriage is in the lowered position. The drop seal assembly activator may be self-adjusting to cause the elastic seal to contact the floor surface below the door panel when the door panel is in the closed position when the floor surface is spaced apart from the bottom portion of the door panel by any distance within a determined range of distances. The drop seal assembly may include a first magnet coupled to a leading end of the carriage, and the drop seal assembly activator may include a second magnet coupled to the door frame, and when the door panel is moved from the open position toward the closed position the second magnet repels the first magnet which imparts the horizontal force to the carriage of the drop seal assembly to cause the carriage to move from the raised position to the lowered position. The door panel may be in the closed position, the first magnet may be spaced apart from the second magnet by an air gap.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
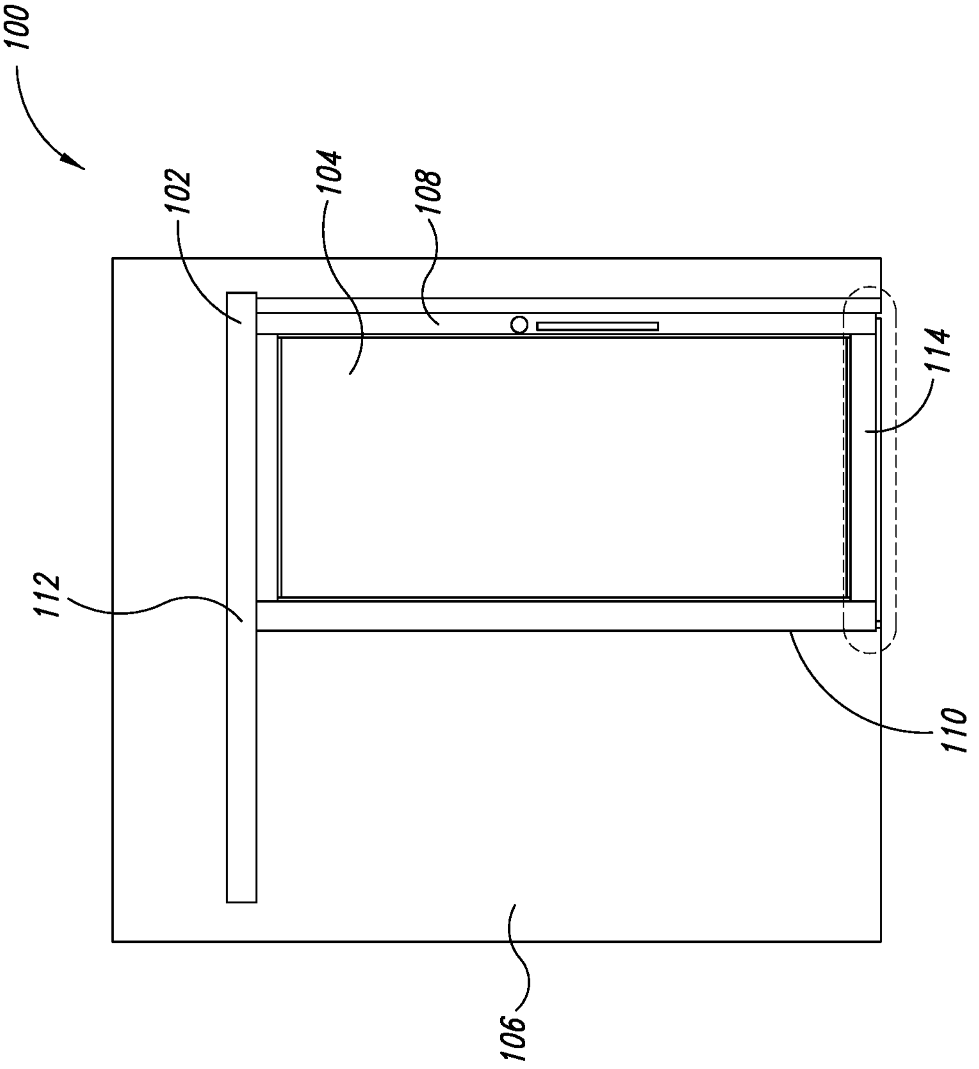
FIG. 1 is an elevational view of a top-hanging sliding door which includes a bottom acoustic seal, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure relate to providing various seals (e.g., acoustic seals) for sliding doors, such as top-hanging sliding doors. Initially, implementations for top-hanging sliding doors including a bottom guide and seal are discussed with reference to FIGS. 1-15. Then, implementations for top-hanging sliding doors including wedge design top seals are discussed with reference to FIG. 16-24B. Finally, implementations for top-hanging sliding doors include rear seals are discussed with reference to FIG. 25A-32. It should be appreciated that the various features of the implementations discussed herein may be modified or combined to provide doors having sealing characteristics desired for various particular applications.

Top-Hanging Sliding Doors Including Bottom Guide and Seal

One or more implementations of the present disclosure are directed to a drop seal assembly which is concealed within an opening in the bottom of a sliding door panel of a top-hanging sliding door. The drop seal assembly may include bottom sill guide which defines a downward facing elongated slot or track which receives a sill guide therein such that the bottom sill guide functions a retainer to keep the bottom of the sliding door panel in place and does not allow the door panel to swing out and away from the door frame. The drop seal assembly also includes a drop down acoustic seal which automatically drops down to contact the floor surface below the door panel when the door panel is moved from an open position into a closed position to provide a physical barrier, to block sound, air light and/or smoke from passing through at the bottom of the door panel when the door is in the closed position.

The distance that the seal drops down upon closing of the door panel, sometimes referred to herein as the "extension distance" or "drop distance," may be selectively adjustable to accommodate variances in the air gap between the bottom of the door panel and the floor surface due to particular installation conditions. As discussed further below, in at least some implementations this adjustment feature is provided by an adjustable sill guide which interacts with the drop seal assembly when the door panel is moved into the closed position. The adjustable sill guide may be movable between a plurality of different positions, wherein each of the plurality of positions provides a different drop distance for the seal when the door panel is in the closed position.

In at least some other implementations, rather than the adjustable sill guide, a concealed magnetic bottom seal activator is used to provide self-adjusting activation of the door bottom seal assembly using two opposing magnets. In such implementations, a fixed sill guide may still be used as a retainer to prevent the bottom of the door panel from swinging out away from the door frame. One of the magnets may be placed on a stile pocket of the door frame, and the other magnet may be mounted to a leading edge of a movable drop portion of the drop seal assembly. The magnets may be arranged to be in opposing reverse polarity such that when the door panel is moved to the closed position from the open position, the magnet on the movably drop seal assembly comes into close proximity with the magnet fixed on the door frame. The horizontal opposing magnetic force is transformed into a vertical force, as discussed further below, which forces the seal downward into contact with the floor surface below the door panel. In such implementations, an air gap between the two magnets when the door panel is in the closed position may allow for a variance in the distance that the seal extends downward to be absorbed without requiring any manual adjustment mechanism.

FIG. 1 shows a front elevational view of a top-hanging sliding door 100 which includes a door frame 102 that supports a sliding door panel or leaf 104. The door panel 104 is movable between a closed position (as shown) wherein the door panel covers an opening in a wall 106 and an open position wherein the door panel is moved to the left to expose the door opening in the wall. In other implementations, the top-hanging sliding door 100 may be configured to open to the right ("right opening" or "right handed") rather than open to the left ("left opening" or "left handed"). The door panel 104 includes a leading edge 108 and a trailing edge 110 opposite the leading edge. The door panel 104 maybe top-hanging from a track disposed in a top portion 112 of the door frame 102 with no exposed floor track at a bottom 114 of the door panel, such that there is an air gap between the bottom 114 of the door panel and a floor surface below the bottom of the door panel. As discussed below with reference to FIGS. 2-15B, the bottom 114 of the door panel 104 includes a downward facing opening 116 (see FIG. 9) which receives a drop seal assembly that includes a seal which automatically drops downward to the floor surface when the door panel is moved into the closed position.

Figure 2:
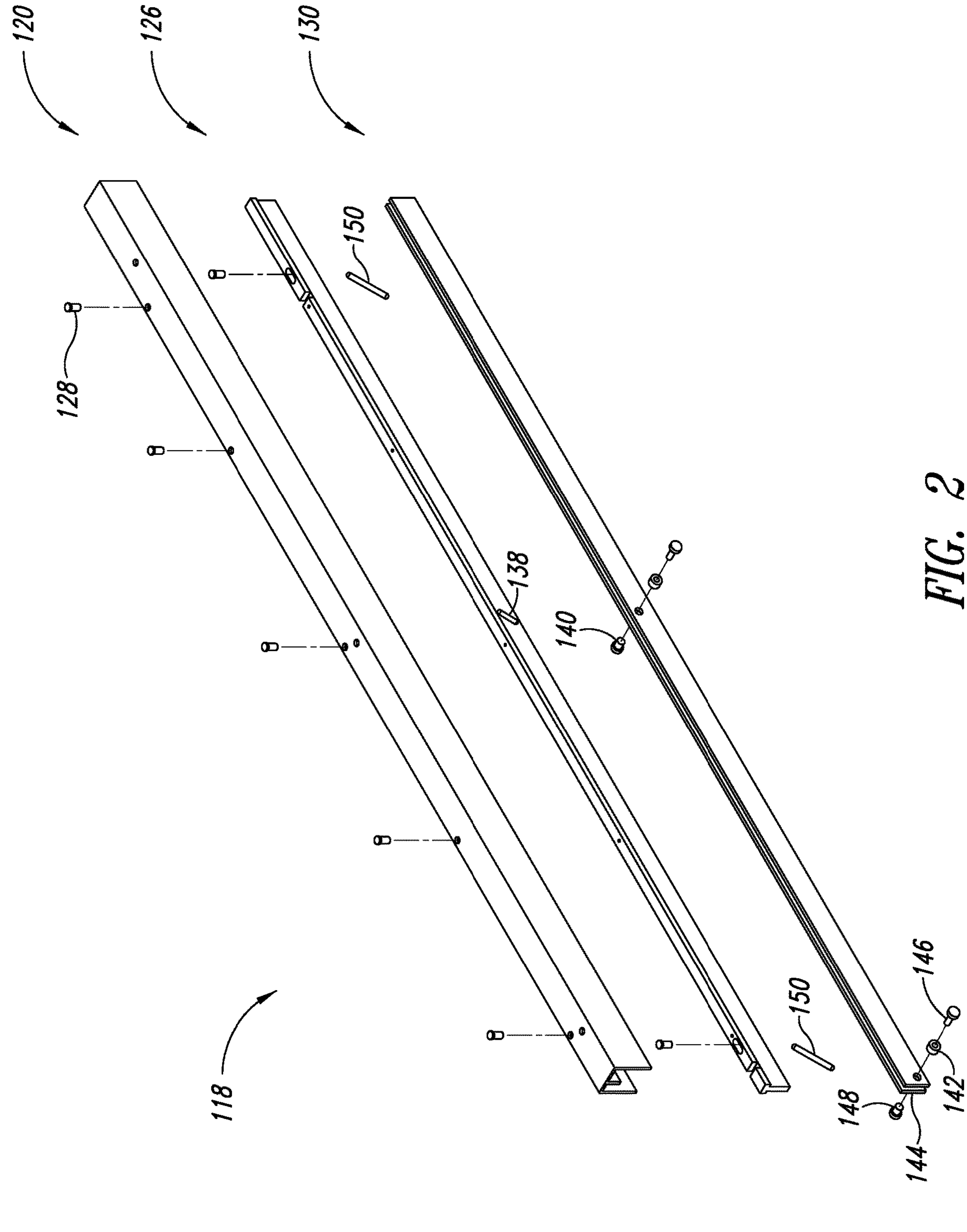
FIG. 2 is an exploded perspective view of a drop seal assembly, according to one illustrated implementation.
Figure 3:
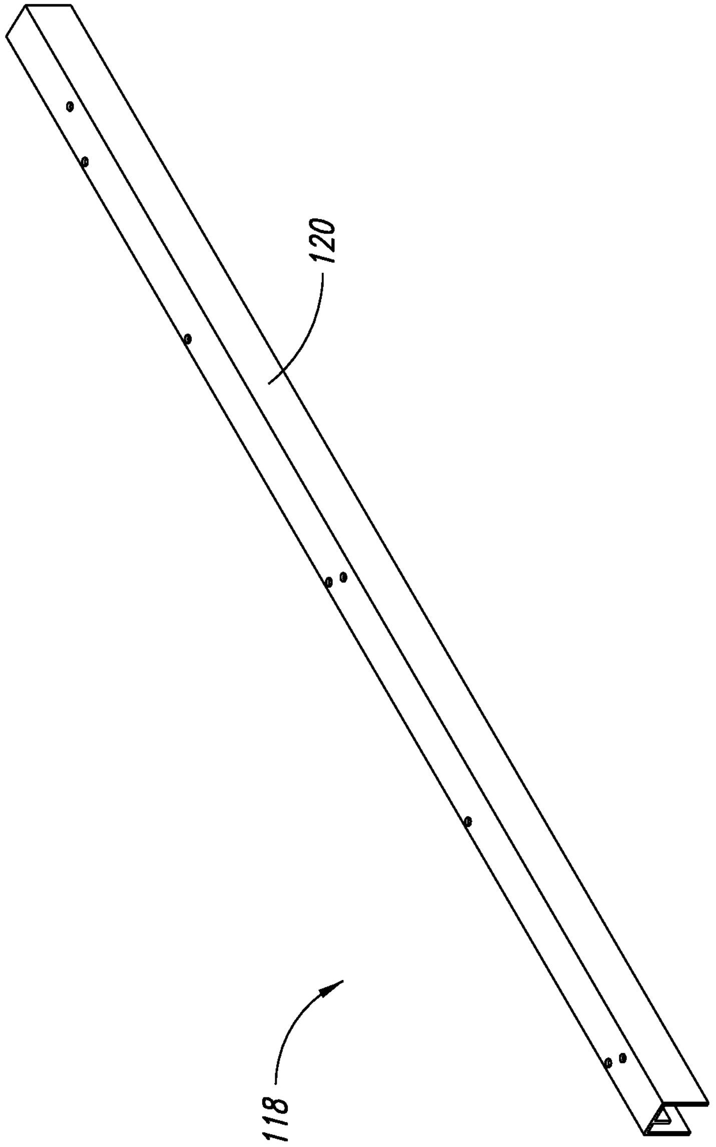
FIG. 3 is a perspective view of the drop seal assembly in assembled form, according to one illustrated implementation.
Figure 4A:
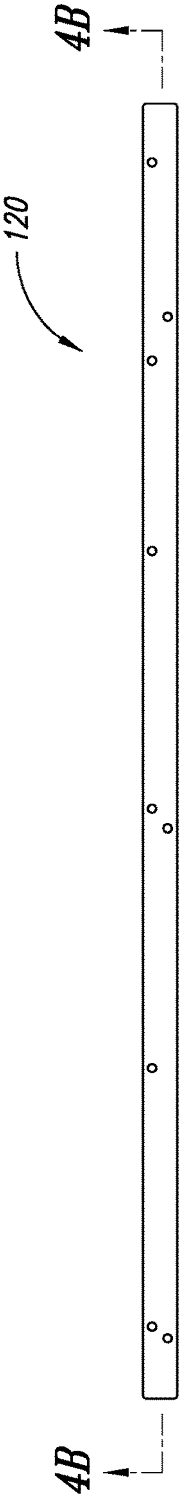
FIG. 4A is a top view of an E-channel extrusion of the drop seal assembly, according to one illustrated implementation.
Figure 4B:
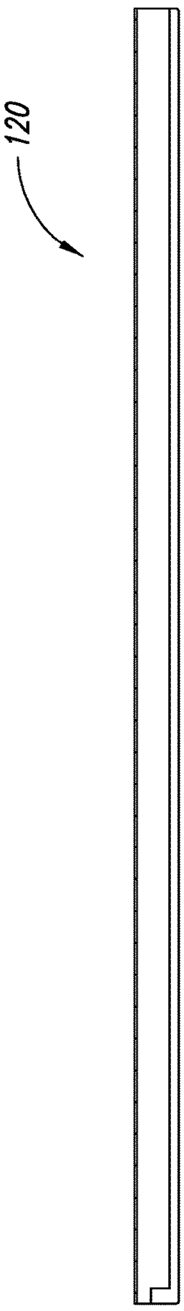
FIG. 4B is a sectional view of the E-channel extrusion of the drop seal assembly, according to one illustrated implementation.
Figure 4C:
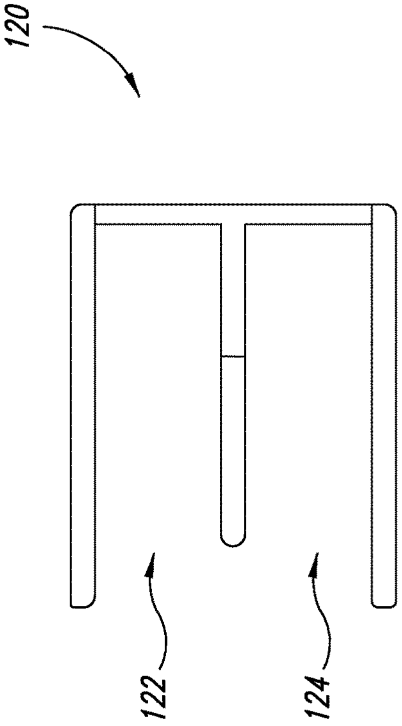
FIG. 4C is an end view of the E-channel extrusion of the drop seal assembly, according to one illustrated implementation.
Figure 5A:
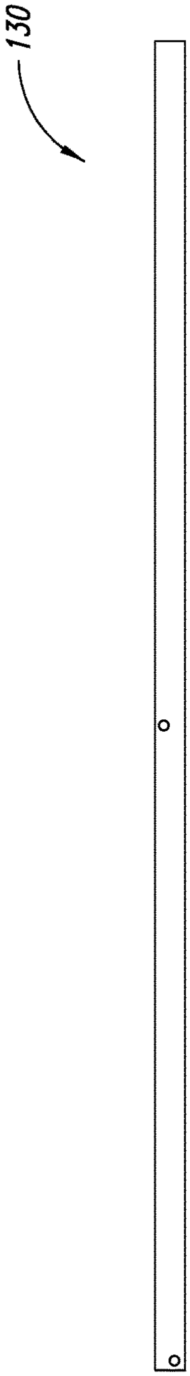
FIG. 5A is an elevational view of a carriage extrusion of the drop seal assembly, according to one illustrated implementation.
Figure 5B:
FIG. 5B is a top view of the carriage extrusion of the drop seal assembly, according to one illustrated implementation.
Figure 5C:
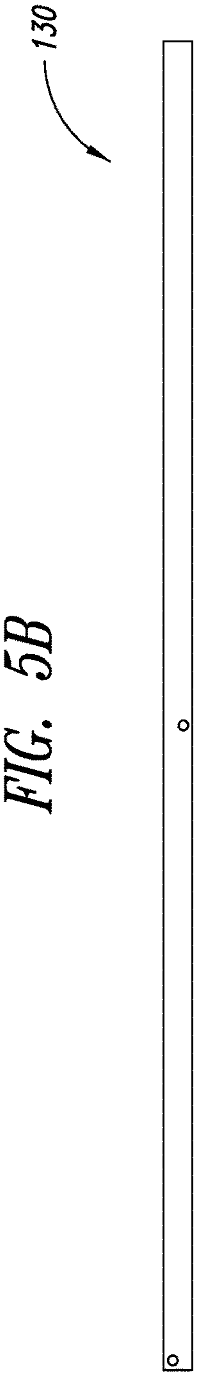
FIG. 5C is an elevational view of the carriage extrusion of the drop seal assembly when the carriage extrusion is inverted, according to one illustrated implementation.
Figure 5D:
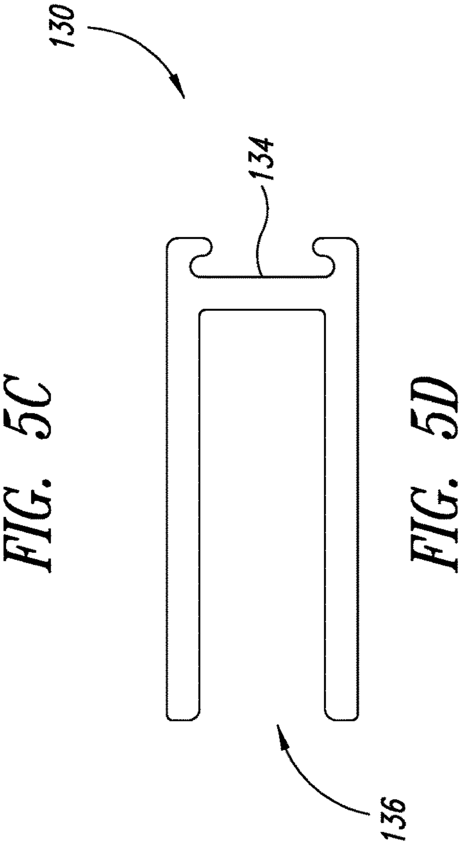
FIG. 5D is an end view of the carriage extrusion of the drop seal assembly, according to one illustrated implementation.
Figure 6A:
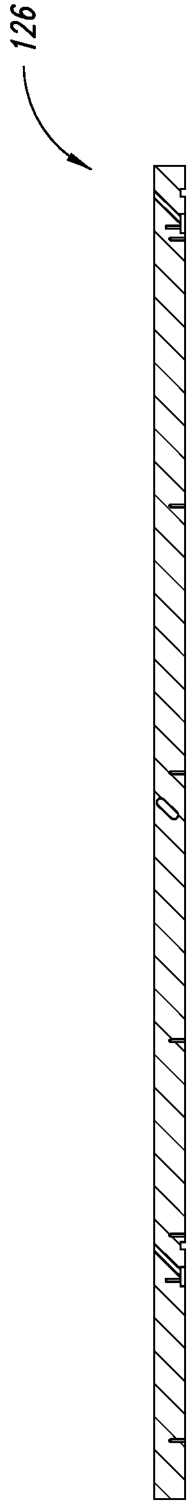
FIG. 6A is an elevational view of an elongated guide bar of the drop seal assembly, according to one illustrated implementation.
Figure 6B:
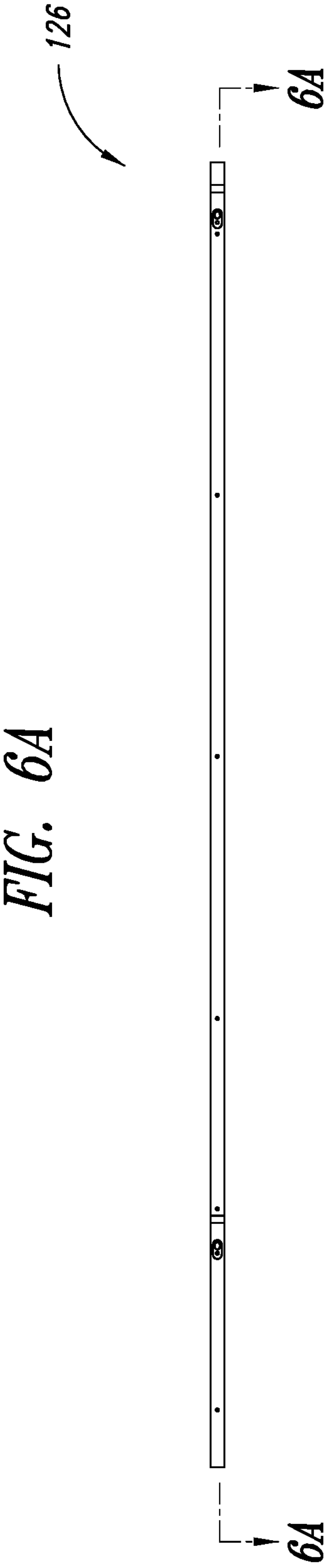
FIG. 6B is a top view of the elongated guide bar of the drop seal assembly, according to one illustrated implementation.
Figure 6C:
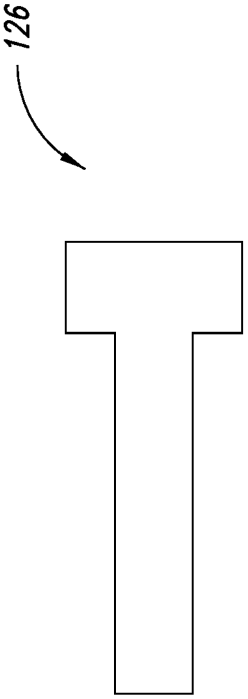
FIG. 6C is an end view of the elongated guide bar of the drop seal assembly, according to one illustrated implementation.
Figure 9:
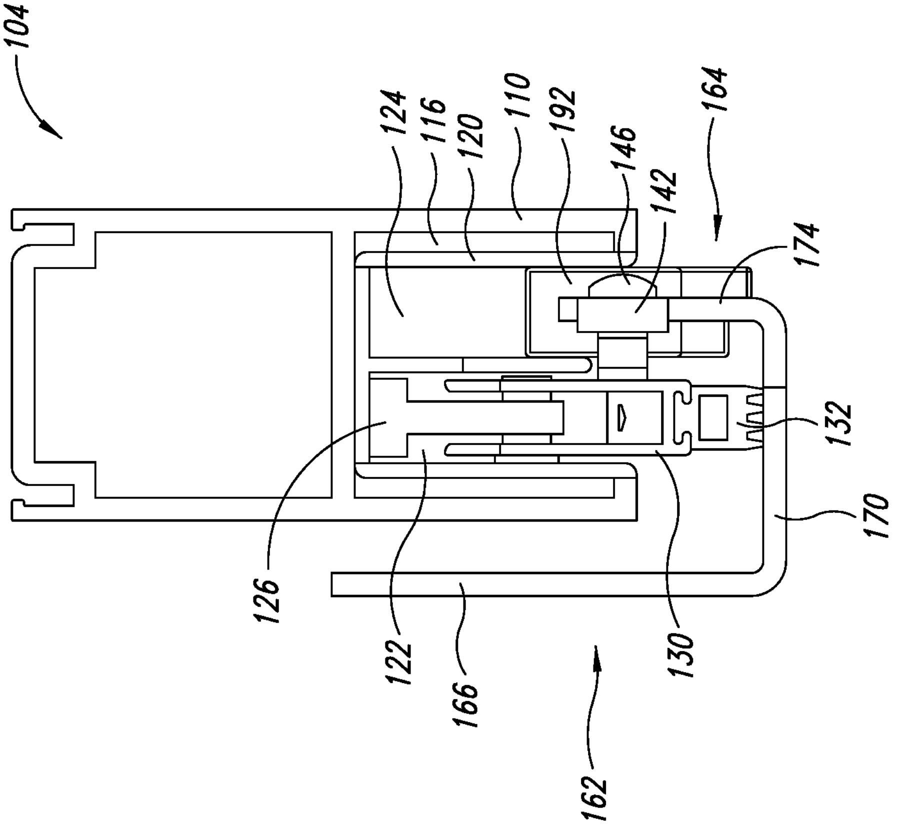
FIG. 9 is an end view of a bottom of a door panel, the drop seal assembly of FIG. 3, and the sill guide of FIGS. 7A-7C, according to one illustrated implementation.

FIGS. 2-6C show various views of a drop seal assembly 118 which may be fixedly positioned within the downward facing opening 116 of the door panel 104. As shown in FIG. 2, the drop seal assembly 118 includes an elongated E-channel extrusion 120 which includes a seal channel 122 (see FIG. 4C) and a sill guide channel 124. As shown in FIG. 9, the E-channel extrusion 120 may be positioned within the downward facing opening 116 in the bottom 114 of the door panel 104.

The drop seal assembly 118 also includes an elongated guide bar 126 that is fixedly coupled to the E-channel extrusion 118 using a plurality of screws 128. The drop seal assembly 118 further includes an elongated carriage extrusion 130 which has a seal 132 (FIG. 9) attached to bottom side 134 (FIG. 5D) of the carriage extrusion, and an upward facing channel 136 to receive the guide bar 126 therein. The guide bar 126 includes a centrally located angled glide slot 138 therein which receives a pin 140 which passes through the upward facing channel 136 when the guide bar 126 is disposed within the upward facing channel of the carriage extrusion 130. The glide slot 138 may be at any suitable angle, such as 45 degrees, 30 degrees, etc. Thus, the pin 140 rides in the guide slot 138 such that when a horizontal force is applied to the carriage extrusion 130, the horizontal force is partially transformed into a vertical force which causes the carriage extrusion to move vertically relative to the vertically fixed components (e.g., the guide bar 126, the E-channel extrusion 120, the door panel 104). As discussed further below, this action causes the seal 132 to automatically move from a raised position wherein the seal is spaced apart from the floor surface to a lowered position wherein the seal is in contact with the floor surface.

A wheel bearing 142 may be fixedly attached to the carriage extrusion 130 proximate the trailing edge 144 thereof. The wheel bearing 142 may be held in place by a screw 146 and a standoff 148, for example. As shown in FIG. 9, the wheel bearing 142 extends outward from the carriage extrusion 130 and is substantially aligned with the sill guide channel 124 of the E-channel extrusion 120 to interact with an adjustable sill guide, as discussed below.

The carriage extrusion 130 may also be coupled to the guide bar 126 via one or more springs 150, which springs bias the carriage extrusion 130 in the raised position to prevent the seal 132 from contacting the floor surface when the door panel 104 is in the open position. As discussed further below, when a horizontal force is applied to the carriage extrusion 130, the carriage extrusion moves vertically due to the pin 140 riding in the guide slot 138 and overcomes the biasing force provided by the springs 150.

Figure 7B:
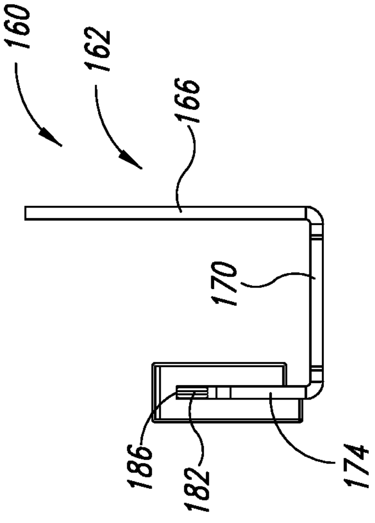
FIG. 7B is an end view of the adjustable sill guide of FIG. 7A, according to one illustrated implementation.
Figure 7C:
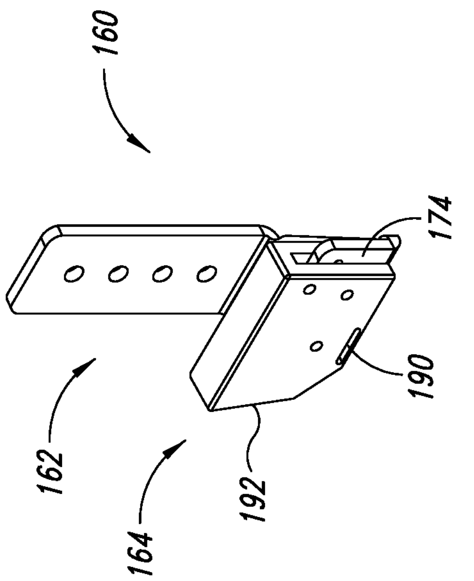
FIG. 7C is an isometric view of the adjustable sill guide of FIG. 7A in assembled form, according to one illustrated implementation.
Figure 7A:
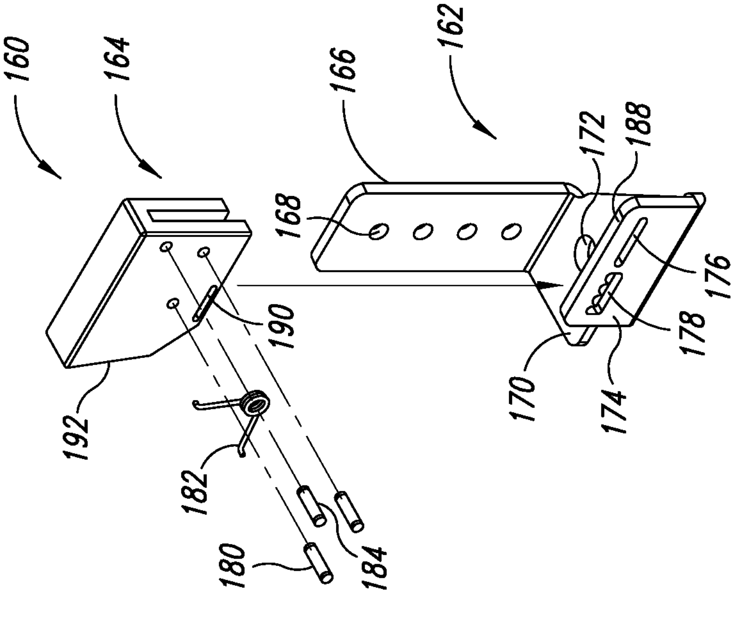
FIG. 7A is an exploded isometric view of an adjustable sill guide for a sliding door panel which opens to the left, according to one illustrated implementation.

FIGS. 7A-7C show various views of an adjustable sill guide 160 which operates as a drop seal assembly activator. The adjustable sill guide 160 includes a metal bracket 162 and an adjustable bumper or bushing 164. The metal bracket 162 includes a first vertical portion 166 which includes four holes 168 therein that receive respective screws (not shown) to allow the metal bracket to be secured to the door frame 102 proximate the trailing edge 110 of the door panel 104 when the door panel is in the closed position. The metal bracket 162 also includes a horizontal portion 170 extending outward from the first vertical portion 166 which includes a countersink hole 172 which receives a screw to fasten the metal bracket to the flooring. The metal bracket 162 also includes a second vertical portion 174 that extends upward from an outermost portion of the horizontal portion 170. The second vertical portion 174 supports the adjustable bumper 164 and includes a smooth elongated slot 176 and a slot 178 with four detent locations on an upper surface thereof.

A pin 180 (FIG. 7A) detents into one of the four detent locations in the slot 178. A spring 182, maintained by a pin 184 which provides a rotational axis for the bumper 164, imparts an upward force on the bumper to maintain the pin 182 in one of the four detent locations of the slot 178. The spring 182 is compressed between an inner downward facing surface 186 (FIG. 7B) of the bumper 164 and a top surface 188 (FIG. 7A) of the second vertical portion 174 of the metal bracket 162. The bumper 164 includes an adjustment slot 190 at the bottom thereof (e.g., at least partially below the bottom 114 of the door panel 104) which receives a screwdriver or other tool to allow the user to rotate the bumper downward about the pin 184, which disengages the pin 180 out of the detent locations of the slot 178 and allows the user to slide the bumper 164 horizontally back and forth. When the user releases downward force applied to the bumper 164, the spring 182 imparts the upward rotational force on the bumper 164 to automatically maintain the pin 180 in one of the four detent locations of the slot 178.

Figure 10A:
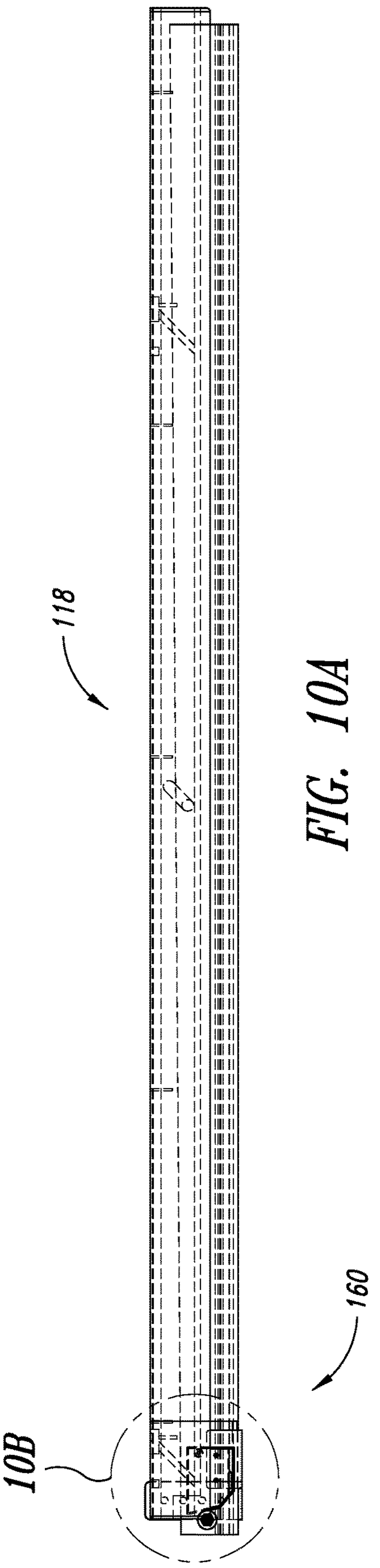
FIG. 10A is an elevational view of the drop seal assembly of FIG. 3 and the sill guide of FIGS. 7A-7C, according to one illustrated implementation.
Figure 10B:
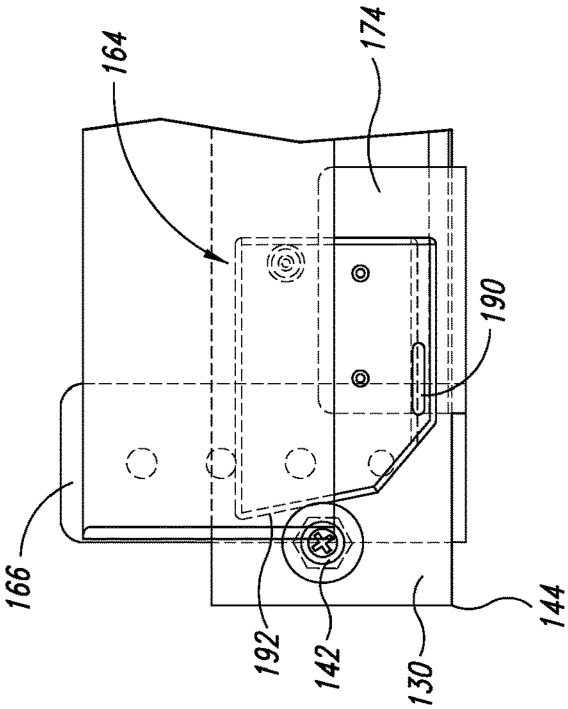
FIG. 10B is a detailed view of a portion of FIG. 10A designated as detail 10B, according to one illustrated implementation.
Figure 11:
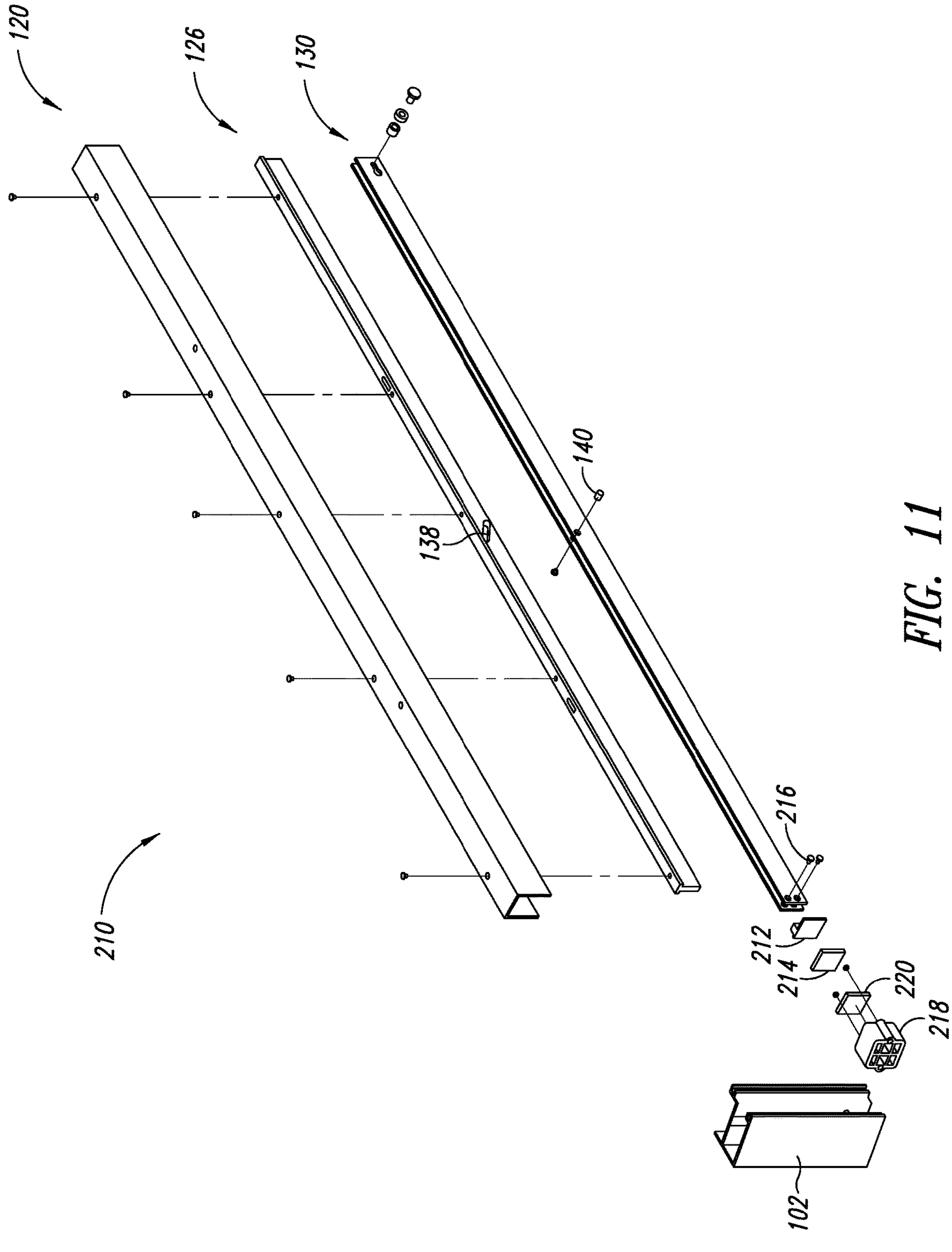
FIG. 11 is an exploded perspective view of a drop seal assembly which includes a concealed magnetic bottom seal activator, according to one illustrated implementation.
Figure 12B:
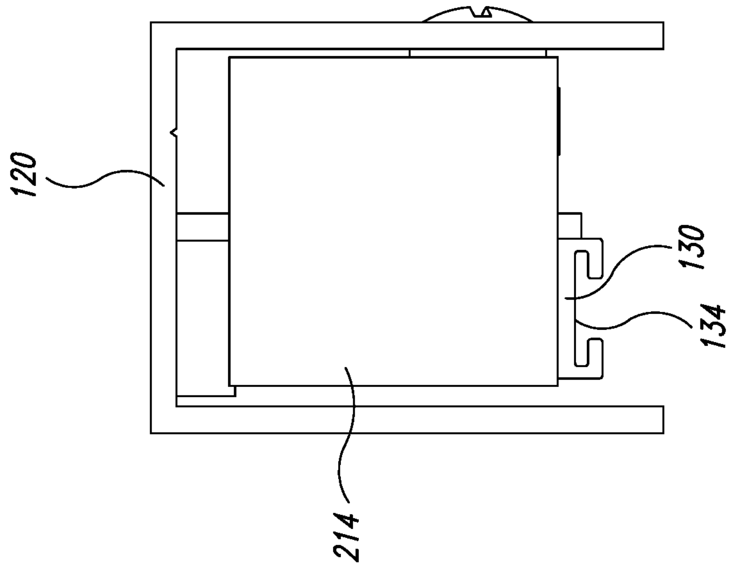
FIG. 12B is a leading end view of the drop seal assembly of FIG. 11, according to one illustrated implementation.
Figure 12A:
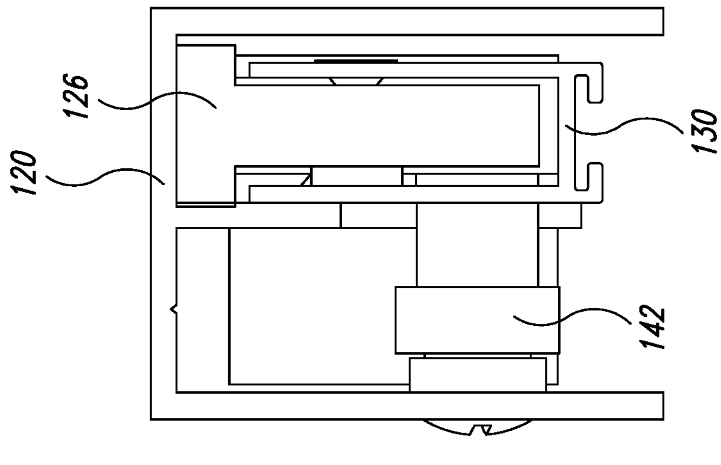
FIG. 12A is a trailing end view of the drop seal assembly of FIG. 11, according to one illustrated implementation.
Figure 13:
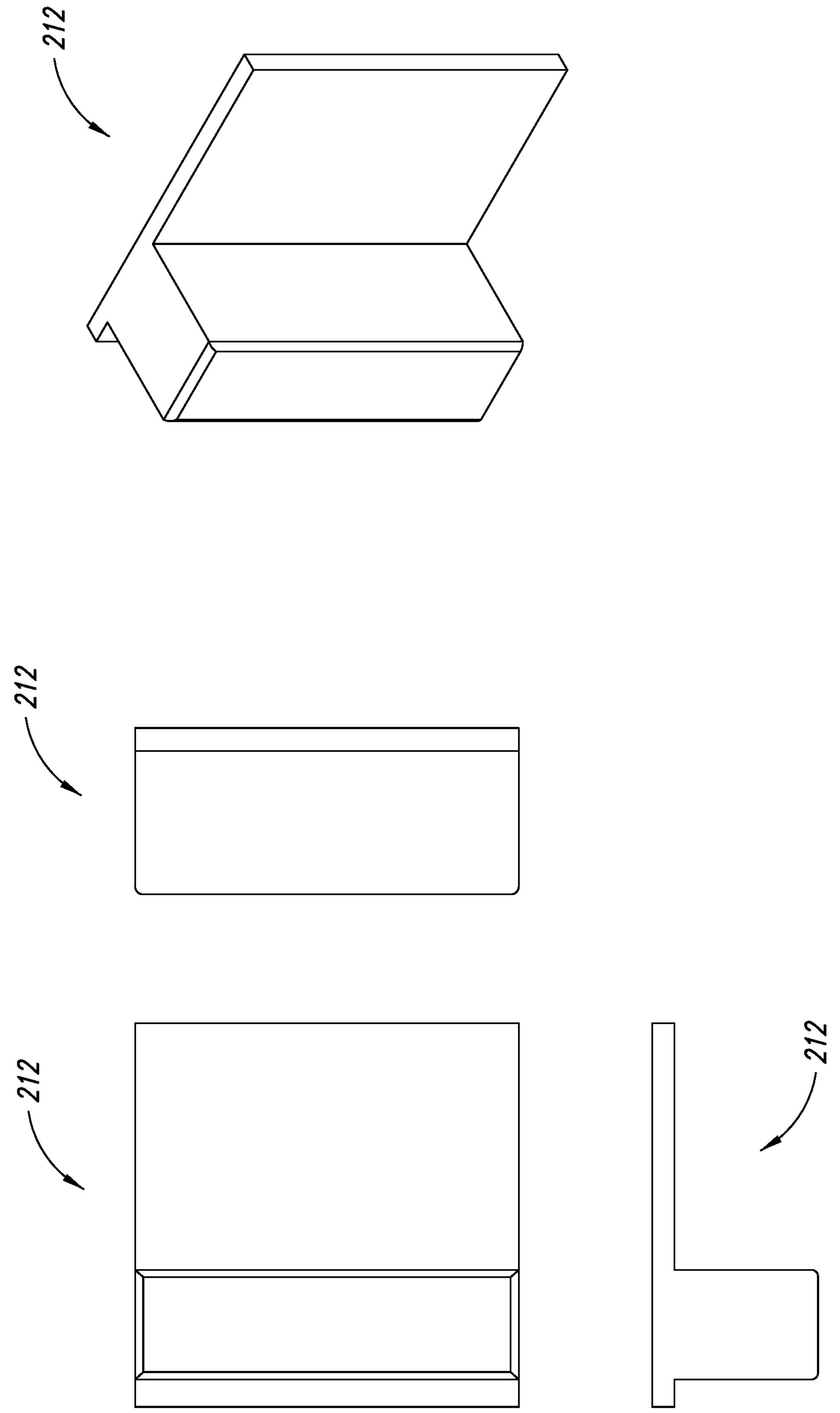
FIG. 13 shows various views of a magnetic bracket of the drop seal assembly of FIG. 11 which supports a first magnet, according to one illustrated implementation.
Figure 14:
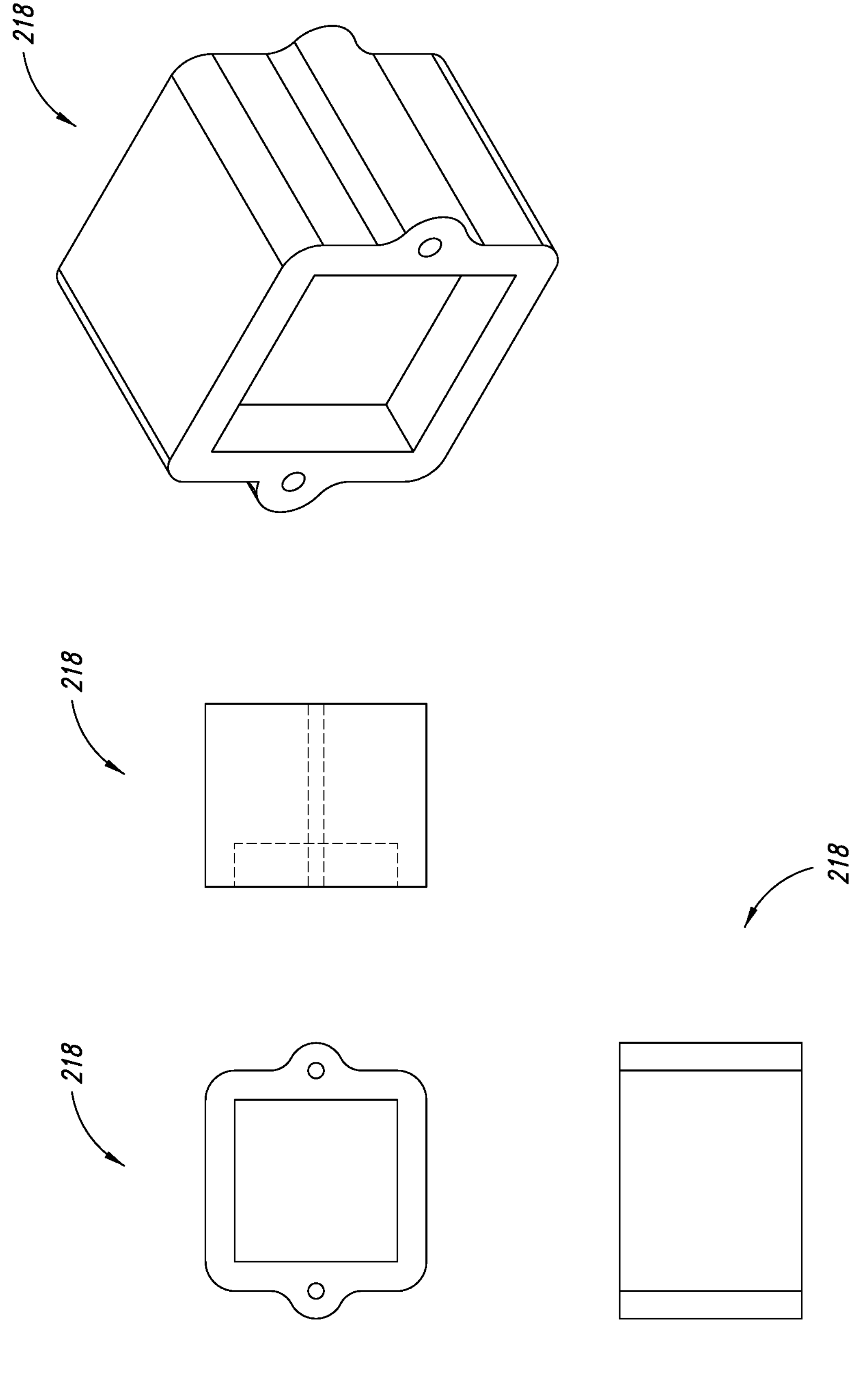
FIG. 14 shows various views of a magnetic bracket which is coupled to a stile pocket of a door frame and supports a second magnet which opposes the first magnet of the drop seal assembly of FIG. 11, according to one illustrated implementation.
Figure 15A:
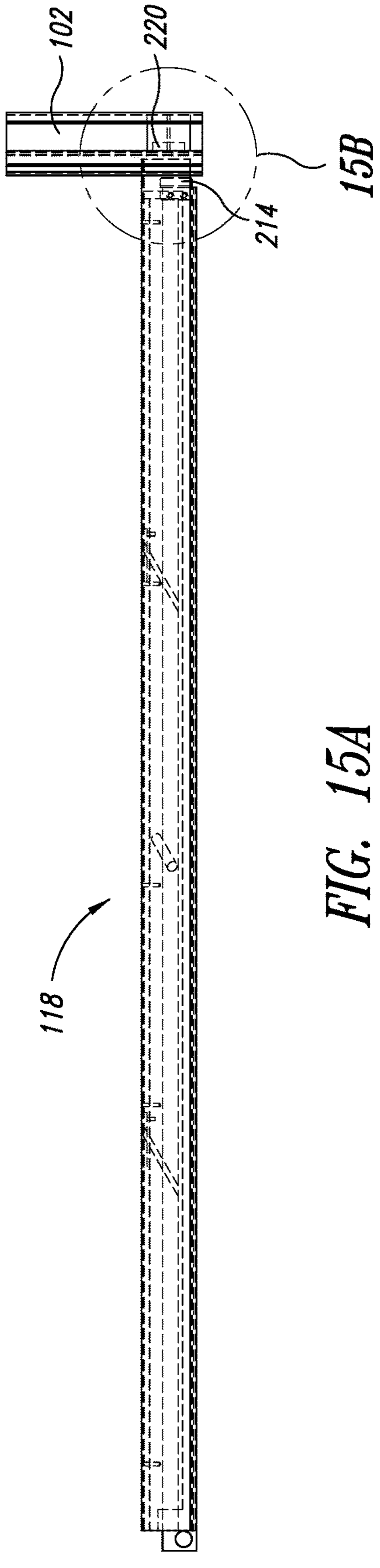
FIG. 15A is an elevational view of the drop seal assembly and stile pocket of FIG. 11, according to one illustrated implementation.
Figure 15B:
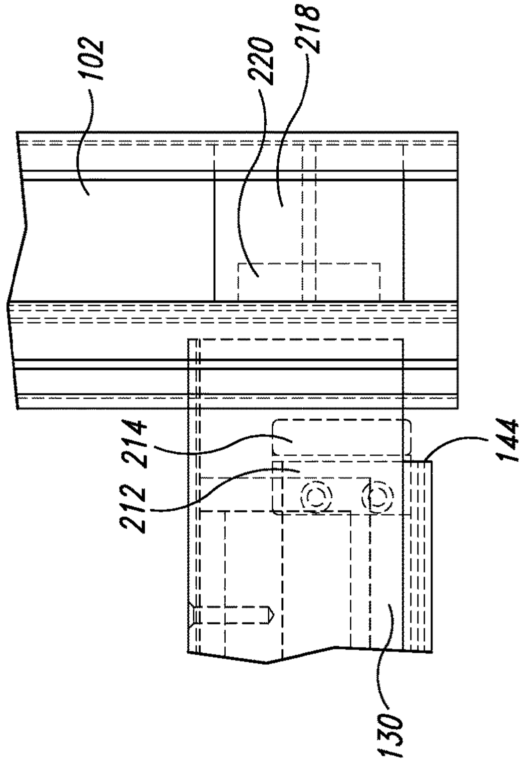
FIG. 15B is a detailed view of a portion of FIG. 15A designated as detail 15B, according to one illustrated implementation.

As shown best in FIG. 10B, when the door panel 104 carrying the drop seal assembly 118 slides toward the closed position, the wheel bearing 142 attached to the carriage extrusion 130 contacts an angled bearing surface 192 of the bumper 164 of the adjustable sill guide 160, which imparts a horizontal force on the carriage extrusion, which causes the carriage extrusion to drop down at the angle of the guide slot 138 in which the pin 140 rides against the force of the biasing springs 150 so that the seal 132 contacts and presses against the floor surface.

Referring back to FIG. 7A, by adjusting in which detent location of the slot 178 the pin 180 resides, the horizontal location of the bumper 164 may be selectively adjusted. In particular, the bumper 164 may be moved toward the latch jamb of the door frame 102 such that the bearing 142 contacts the bearing surface 192 of the bumper 164 later when the door panel 104 is closed to reduce the drop distance. Similarly, the bumper 164 may be moved away from the latch jamb of the door frame 102 such that the bearing 142 contacts the bearing surface 192 earlier when the door panel 104 is closed to increase the drop distance, thereby accommodating installations which have varying air gaps between the bottom 110 of the door panel 104 and the floor surface.

Figure 8:
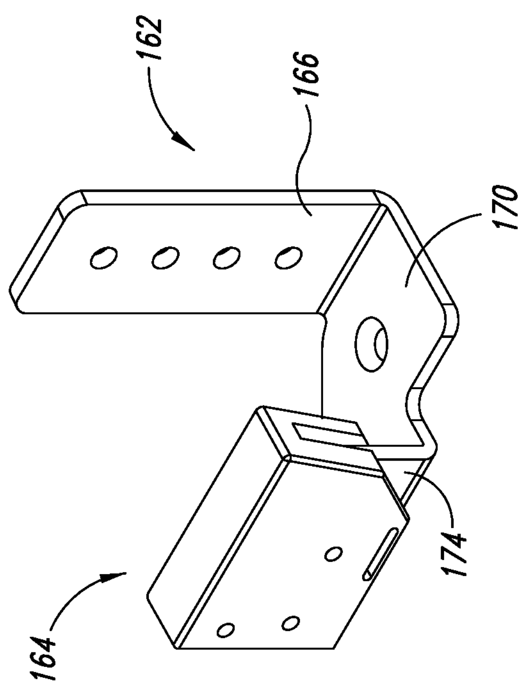
FIG. 8 is an isometric view of an adjustable sill guide for a sliding door panel which opens to the right, according to one illustrated implementation.

FIG. 8 shows an implementation for an adjustable sill guide 200 which may be used for a door panel which opens to the right. The adjustable sill guide 200 is substantially similar to the adjustable sill guide 164, so a detailed discussion of the sill guide 200 is not required.

FIGS. 11-15B show various views of a drop seal assembly 210 which utilizes a magnetic drop seal activator. The drop seal assembly 210 is similar in many aspects to the drop seal assembly 118 discussed above, so only differences between the drop seal assembly 210 and the drop seal assembly 118 are discussed herein for the sake of brevity.

In this implementation, instead of activation of the drop seal assembly 210 by the wheel bearing 142 contacting the bumper 164 of the adjustable sill guide 160, opposing magnets are used to drive the carriage extrusion 130 downward from the raised position to the lowered position. In particular, a first magnet bracket 212 which supports a first magnet 214 is coupled to the leading end 144 of the carriage extrusion 130 via screws 216. A second magnet bracket 218 which supports a second magnet 220 is coupled to the door frame 102 (e.g., stile pocket) at a position that is horizontally aligned with the first magnet 214 (see FIGS. 15A-15B).

The first magnet 214 and the second magnet 220 are oriented such that the same poles face each other (i.e., North pole facing North pole, or South pole facing South pole), which causes a repelling force between the first magnet 214 and the second magnet 220 when the first magnet is brought into proximity of the second magnet as the door panel 104 is moved from the open position into the closed position. Thus, instead of pulling the carriage extrusion 130 backward when the door panel 104 closes using the wheel bearing 142, as discussed above, in this implementation the carriage extrusion 130 is pushed backwards using the repelling force between the first magnet 214 and the second magnet 220 to cause the carriage extrusion to move as described above from the raised position to the lowered position.

One advantage of the magnetic drop seal activator implementation is that the system is self-adjusting. The air gap between the first and second magnets 214 and 220 allows for variation in distances between the bottom 110 of the door panel 104 and the floor surface. In particular, the force between the first magnet 214 and the second magnet 220 when the door panel 104 is in the closed position is strong enough to drive the carriage extrusion 130 downward such that the seal 132 compresses against the floor surface, but the force is not so strong so as to prevent the door panel 104 from shutting and/or remaining in the closed position. In other words, if the floor surface is lower relative to the bottom 110 of the door panel 104, the magnetic force between the first and second magnets 214 and 220 drives the carriage extrusion 130 downward to the lower floor surface for a range of distances between the bottom 110 of the door panel 104 and the floor surface.

In at least some implementations, a fixed or non-adjustable sill guide may be positioned in the still guide channel 124 of the E-channel extrusion 120 to prevent the bottom 110 of the door panel 104 from swinging outward from the door frame 102 and wall 106. In installations which do not include a drop seal assembly, the same fixed sill guide may be used. Thus, another advantage of the magnetic drop seal activator implementation is that the same fixed sill guide may be used for all types of installations including those which include a drop seal assembly and those which do not include a drop seal assembly.

Top-Hanging Sliding Doors Including Wedge Design Top Seals

FIGS. 16-21B show various views of a first implementation of a top-hanging sliding door 300 that includes a door seal system 302 which utilizes a wedge design top seal with mating wedges. Increasingly, there is a demand in the market to use sliding doors for their space saving attributes. Historically, effective sealing of a sliding door has been difficult to achieve. Traditional elastomeric seal materials cause friction which is detrimental to the sliding motion of the door. As such, prior methods have used such material as brushes or felt pile seals to reduce sliding friction while still providing some effect of a seal. With these types of seals, the felt pile is in contact with mating surface for the full linear travel of the door panel.

One or more implementations discussed herein utilizes two angled mating surfaces, one angle surface on the fixed door frame and one reversed angled surface on the moving door panel. The moving door panel slides directly parallel to the fixed frame. In operation, the faces of the two angled seal surfaces move closer together or further apart as the sliding panel moves parallel with the door frame. This creates a mating seal surface that is only in frictional contact with the mating seal surface for a small portion of the linear slide distance, rather than the entire slide distance. By using a compressive seal, such as a hollow elastomer profile or a sponge compound elastomeric profile, a compressive seal can be obtained with very small amount of linear sliding friction during only the very last portion of the sliding motion of the door. Advantageously, the vast majority of slide travel is uninhibited by sliding friction.

Figure 16:
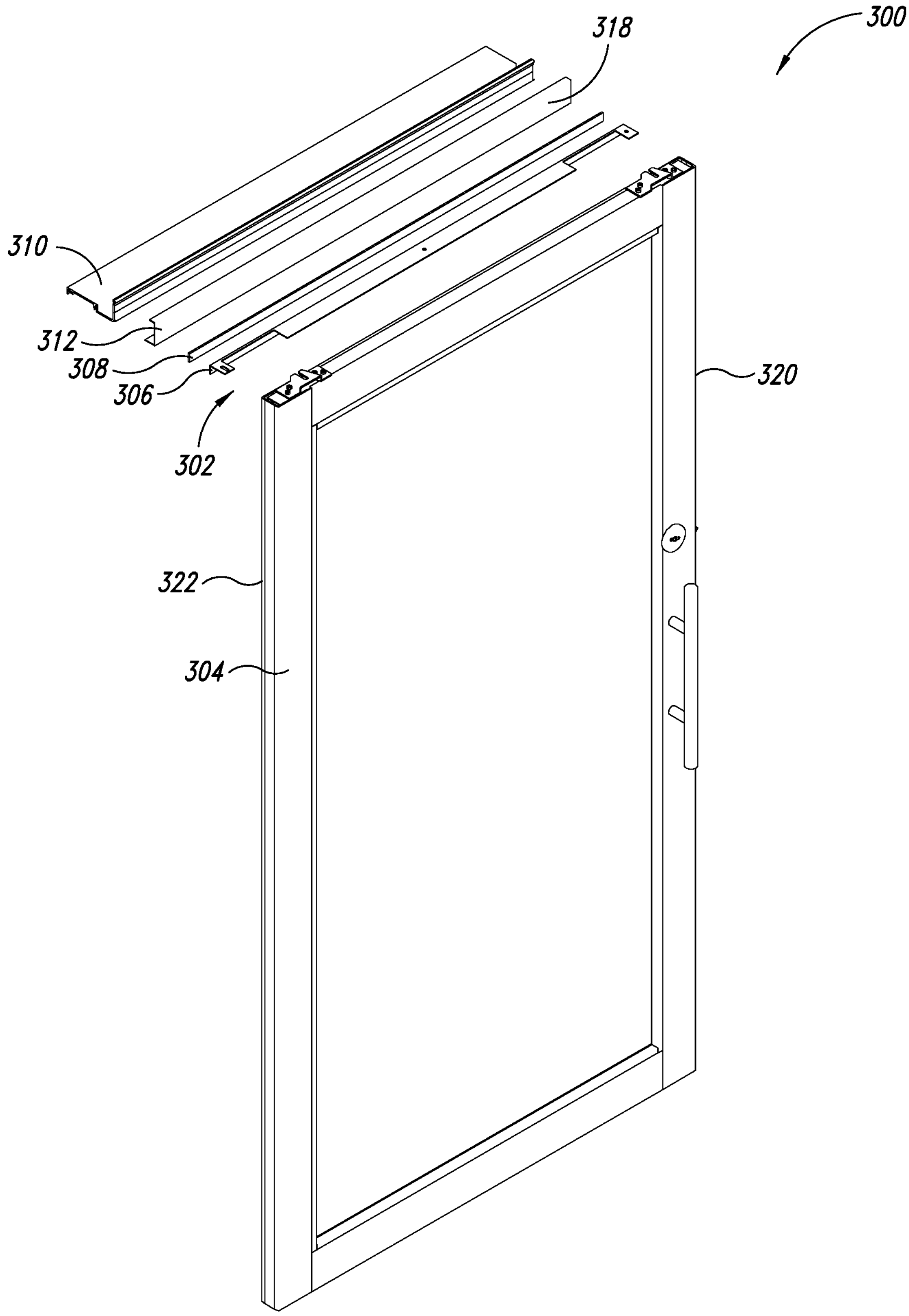
FIG. 16 is a partially exploded view of a top-hanging sliding door which includes a door seal system comprising a wedge top seal having mating wedges, according to one illustrated implementation.
Figure 17:
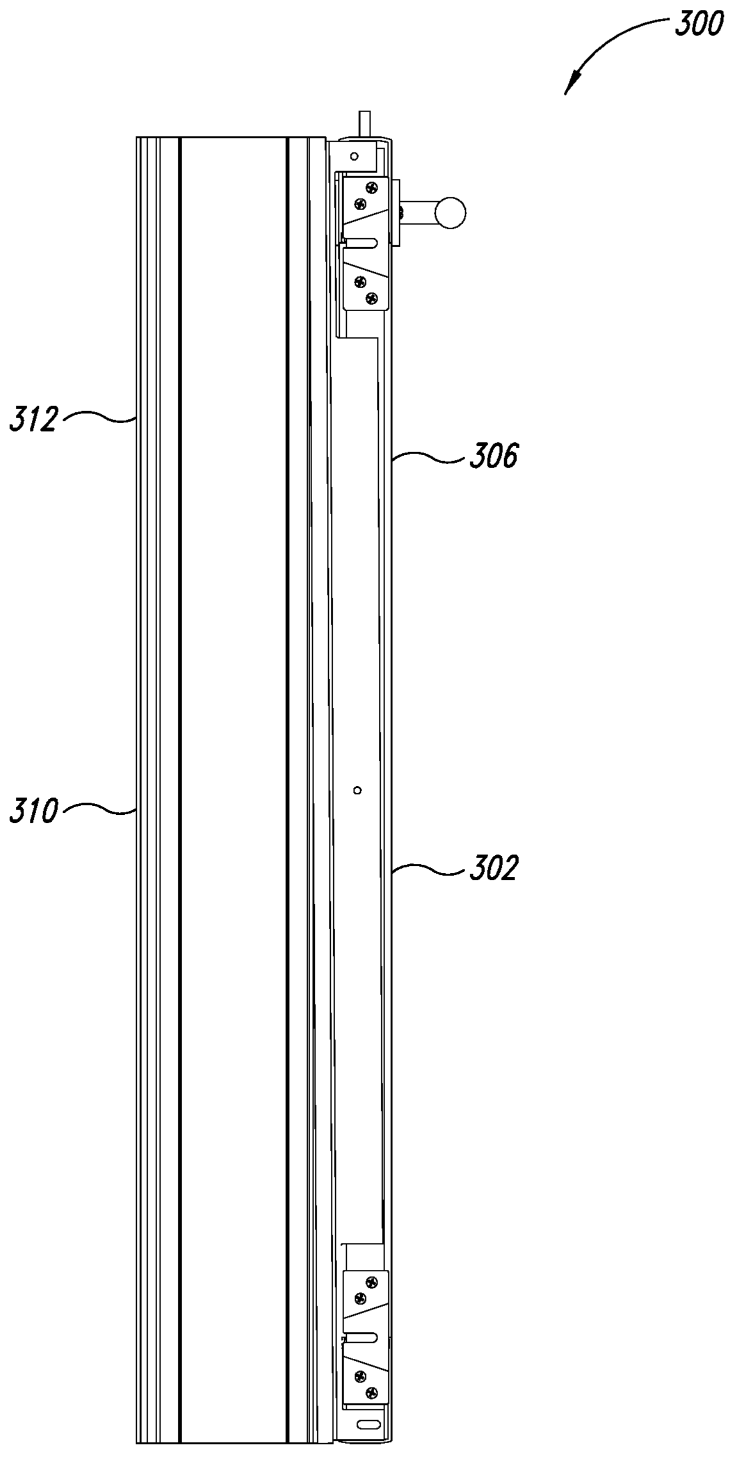
FIG. 17 is a top view of a portion of the top-hanging sliding door of FIG. 16, according to one illustrated implementation.
Figure 18:
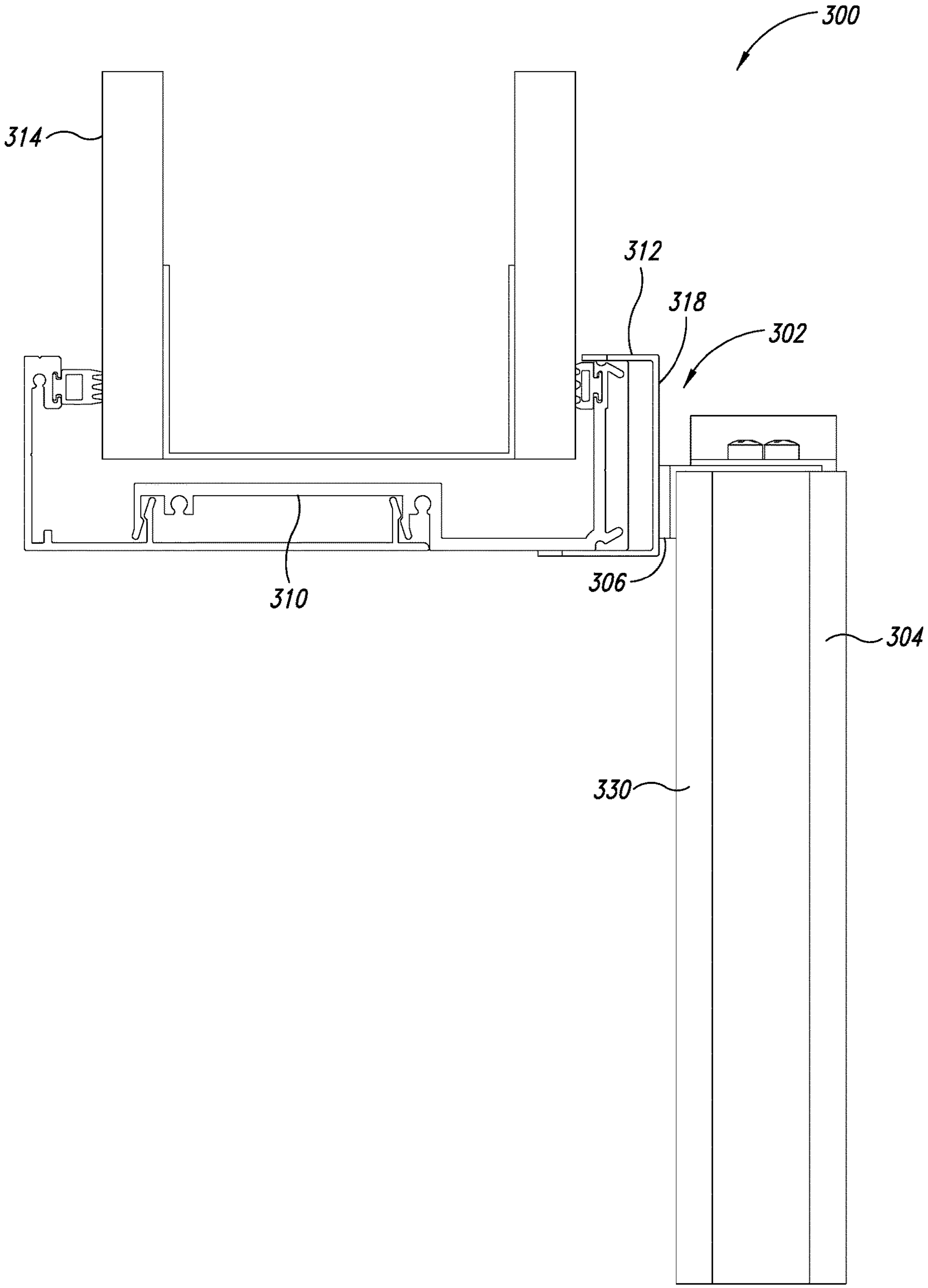
FIG. 18 is a sectional view of a portion of the top-hanging sliding door of FIG. 16, according to one illustrated implementation.

As shown in FIG. 16, the top-hanging sliding door 300 includes a door leaf or panel 304, a door wedge 306, a compression seal 308 coupled to the door wedge, a jamb 310, and a frame wedge 312 coupled to the jamb. As shown in FIG. 18, the jamb 310 is mounted to a wall 314 and the frame wedge 312 encompasses over the top and bottom of the jamb. The frame wedge 312 may be hinged on one end so that it can rotate to form a wedge that is at a non-zero angle $\alpha_1$ (FIG. 19) with respect to a track line 316 (or axis) of a track along which the door panel 304 rides when being moved between the open position and the closed position. As an example, the frame wedge 312 may be at a 0.1 to 4.0 degree angle with respect to the track axis 316.

Figure 19:
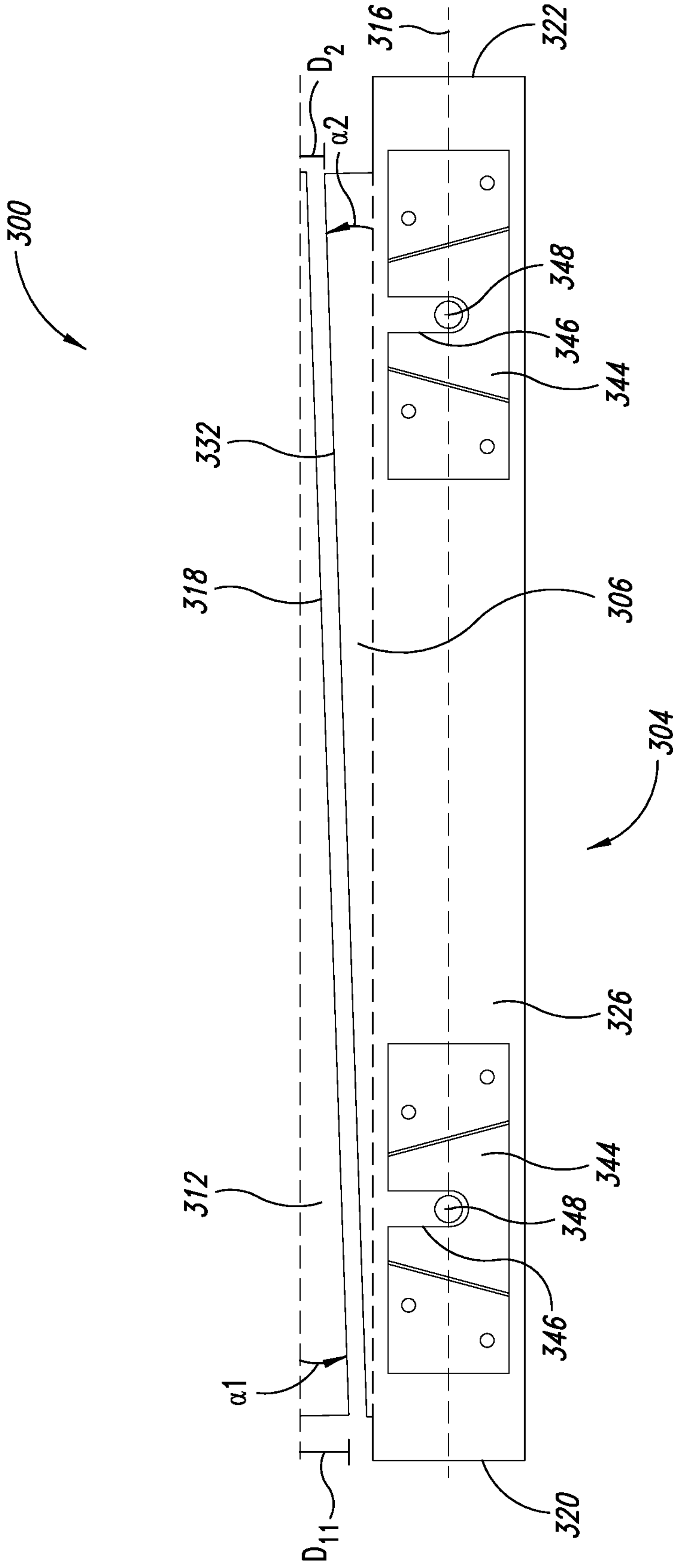
FIG. 19 is a top view of the top-hanging sliding door of FIG. 16, showing the mating wedges thereof, according to one illustrated implementation.

The frame wedge 312 has a frame wedge surface 318 which faces outward from a top portion of the door frame toward the door panel 304. As shown in FIG. 19, the frame wedge surface 318 is positioned to at least substantially horizontally align with a width of the door panel 304 when the door panel is in the closed position. The frame wedge surface 318 is planar in shape and extends outward toward the door panel 304 a first distance $D_1$(FIG. 19) proximate a leading edge 320 of the door panel and extending outward toward the door panel a second distance $D_2$ proximate a trailing edge 322 of the door panel, the first distance $D_1$ greater than the second distance $D_2$, such that the frame wedge surface 318 extends at the non-zero angle $\alpha_1$ with respect to the track axis 316 of the track upon which the door panel slides.

Figure 20:
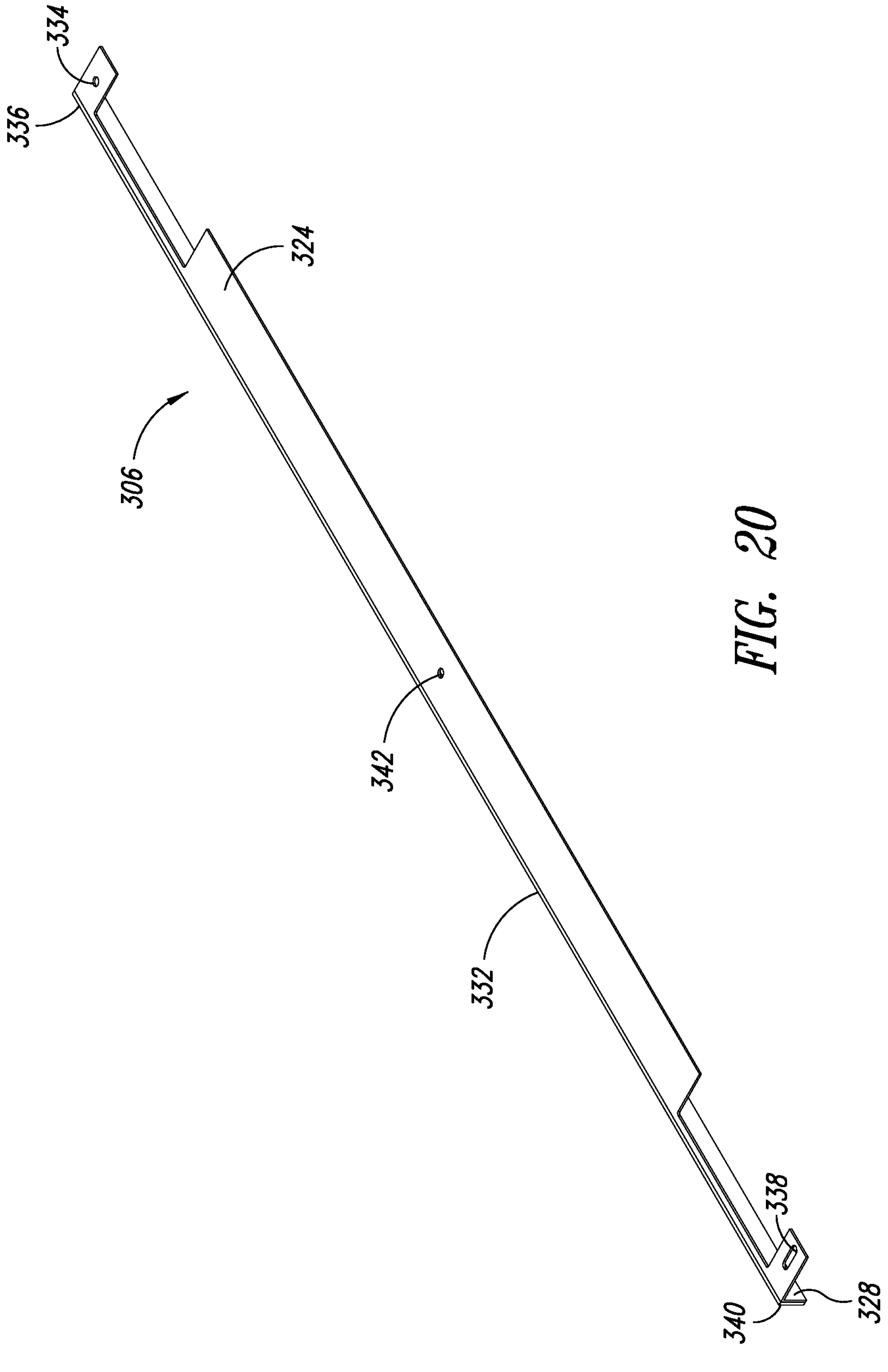
FIG. 20 is an isometric view of a door wedge of the top-hanging sliding door of FIG. 16, according to one illustrated implementation.
Figures 21A, 21B:
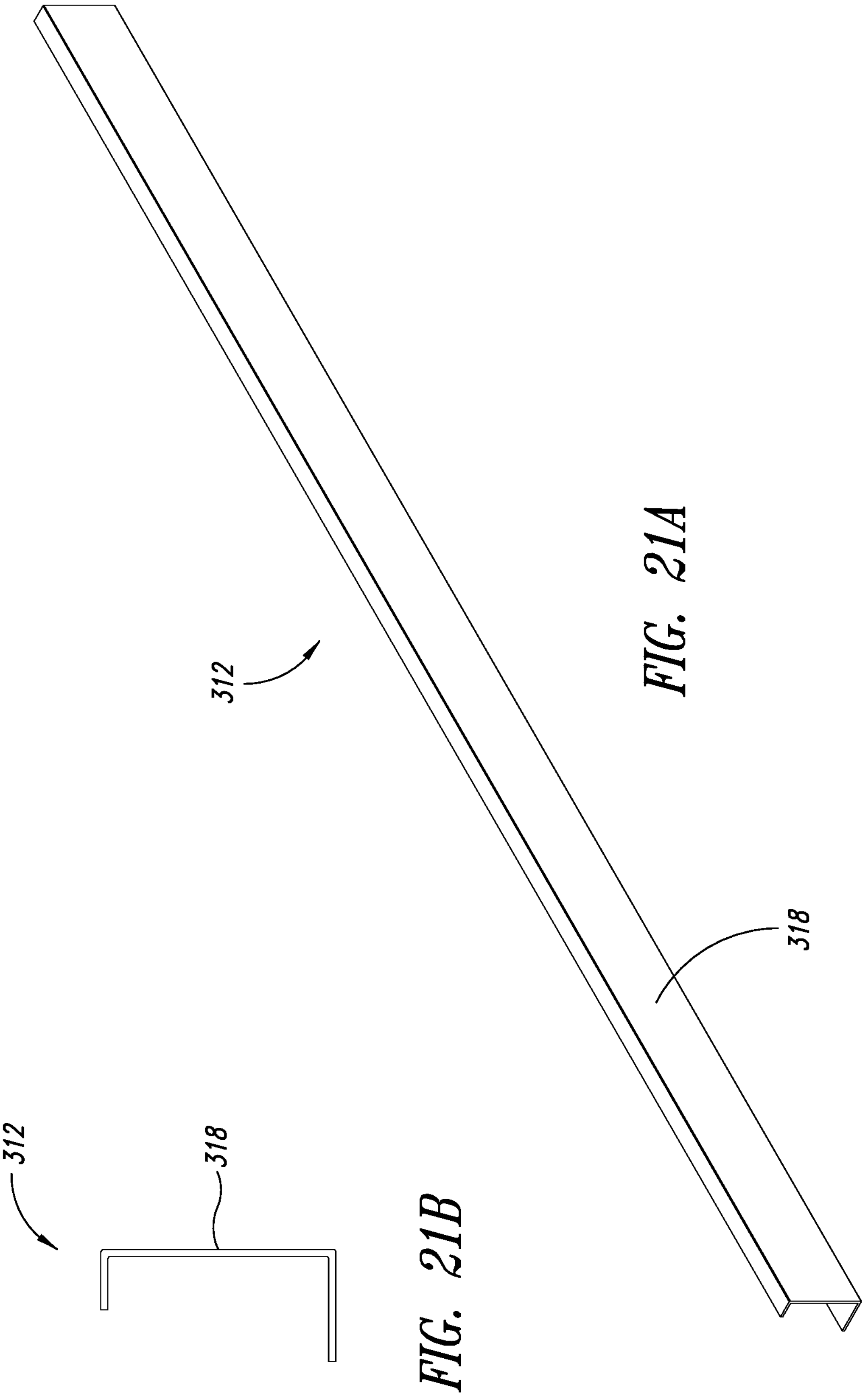
FIG. 21A is an isometric view of a frame wedge of the top-hanging sliding door of FIG. 16, according to one illustrated implementation.
FIG. 21B is a sectional view of a frame wedge of the top-hanging sliding door of FIG. 16, according to one illustrated implementation.
Figure 22A:
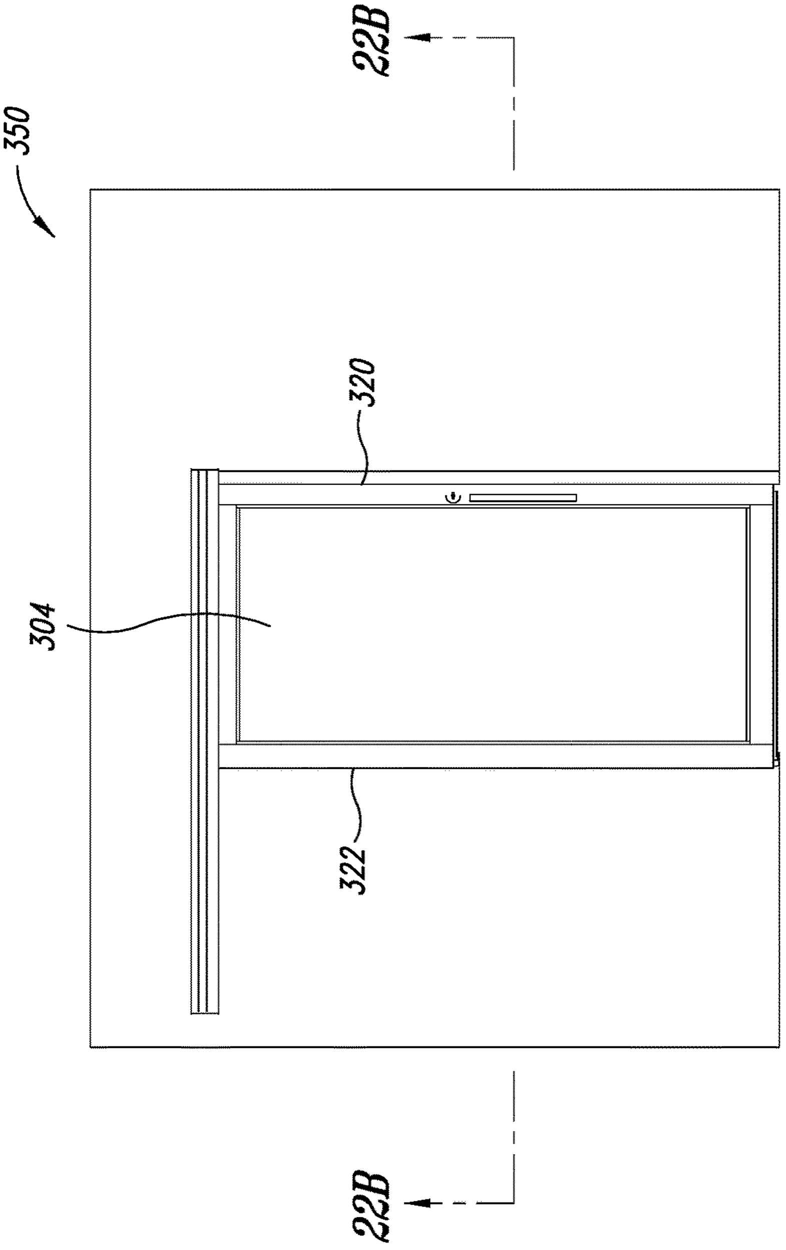
FIG. 22A is an elevational view of a top-hanging sliding door which includes a door seal system comprising an angled leaf which provides a wedge top seal, according to one illustrated implementation.
Figure 22B:
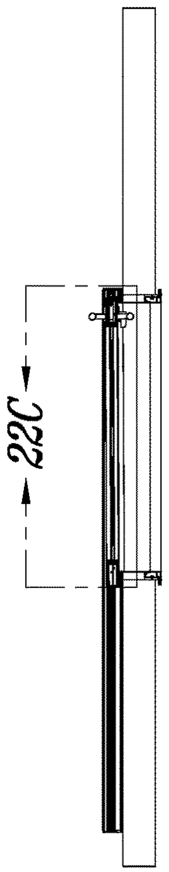
FIG. 22B is a sectional view of the top-hanging sliding door of FIG. 22A taken along the line 22B-22B of FIG. 22A, according to one illustrated implementation.
Figure 22C:
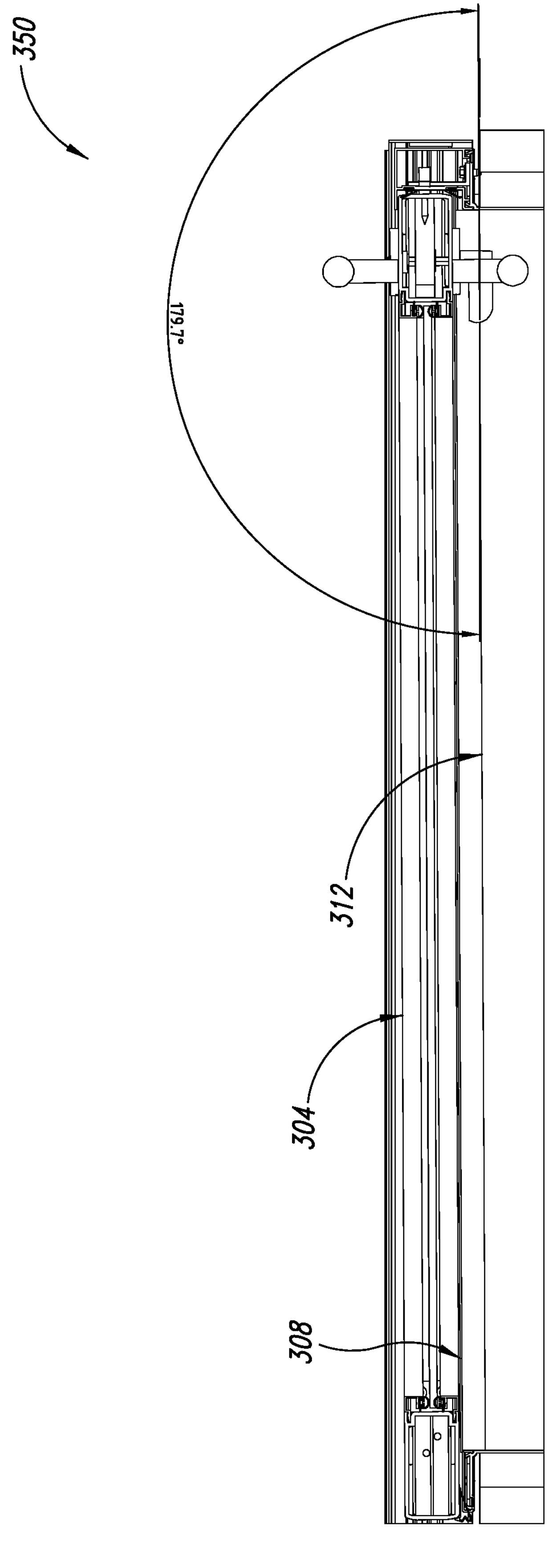
FIG. 22C is a detailed view of the top-hanging sliding door of FIG. 22A taken along the line 22C of FIG. 22B, according to one illustrated implementation.

As shown in FIG. 20, the door wedge 306 may have an "L" shaped profile. A horizontal portion 324 of the door wedge 306 runs over a top horizontal surface 326 of the door panel 304 and a vertical portion 328 of the door wedge 306 extends downward on a rear side 330 (FIG. 18) of the door panel facing the frame wedge 312. The vertical portion 328 of the door wedge 306 may be coupled to the door panel 304 by a suitable fastener (e.g., an adhesive). The door wedge 306 includes a door wedge surface 332 which extends outward from a top portion of the door panel 304 toward the frame wedge surface 318. As shown in FIG. 19, the door wedge surface 332 may be at least substantially parallel to the frame wedge surface 318 such that as the door panel 306 is moved from the open position to the closed position, the door wedge surface engages the frame wedge surface to provide a seal therebetween. In other words, the door wedge surface 332 may be at a reverse non-zero angle $\alpha_2$ (e.g., 0.1 to 4.0 degrees) with respect to the track axis 316 compared to the angle $\alpha_1$ of the frame wedge surface.

The horizontal portion 324 of the door wedge 306 may include a pivot hole 334 toward an end 336 which attaches to the door panel 306 proximate the leading edge 320 thereof and an angle adjustment slot 338 proximate an end 340 of the door wedge which attaches to the trailing edge 322 of the door panel. During installation, the installer may insert a fastener (e.g., screw) into the door panel 304 through the pivot hole 334. Then the installer may pivot the door wedge 306 about the pivot hole 334 to selectively adjust the angle $\alpha_2$ of the door wedge surface 332 of the door wedge to provide suitable mating with the frame wedge surface 318 when the door panel 306 is in the closed position. Then, once the angle $\alpha_2$ has been set, the user may insert or tighten a fastener (e.g., screw) into the door panel 304 through the angle adjustment slot 338. The installer may also insert a fastener into the door panel 304 through a locking hole 342 of the door wedge 306 which is located proximate the center of the horizontal portion 324 of the door wedge. The locking hole 342 acts to lock the position of the door wedge 306 after the installer has made the angle adjustment.

As shown in FIG. 19, hanger brackets 344 may be secured to the top horizontal surface 326 of the door panel 304. The hanger brackets 344 may include U-shaped slots 346 which receive suspension bolts 348 therein from which the door panel 304 is hung from the track (not shown).

As discussed above, at least one of the door wedge surface 332 and the frame wedge surface 318 may include a compression seal 308 (e.g., foam, gasket) thereon. In at least some implementations, the door wedge surface 332 includes a layer of low durometer foam with a low friction coating disposed thereon. For example, the foam may be coupled to the door wedge surface 332 via a suitable adhesive.

The frame wedge 312 and door wedge 306 may be formed of any suitable materials. In at least some implementations, the frame wedge 312 and/or door wedge 306 are formed of aluminum, steel, and/or stainless steel.

Figures 33A, 33B, 33C:
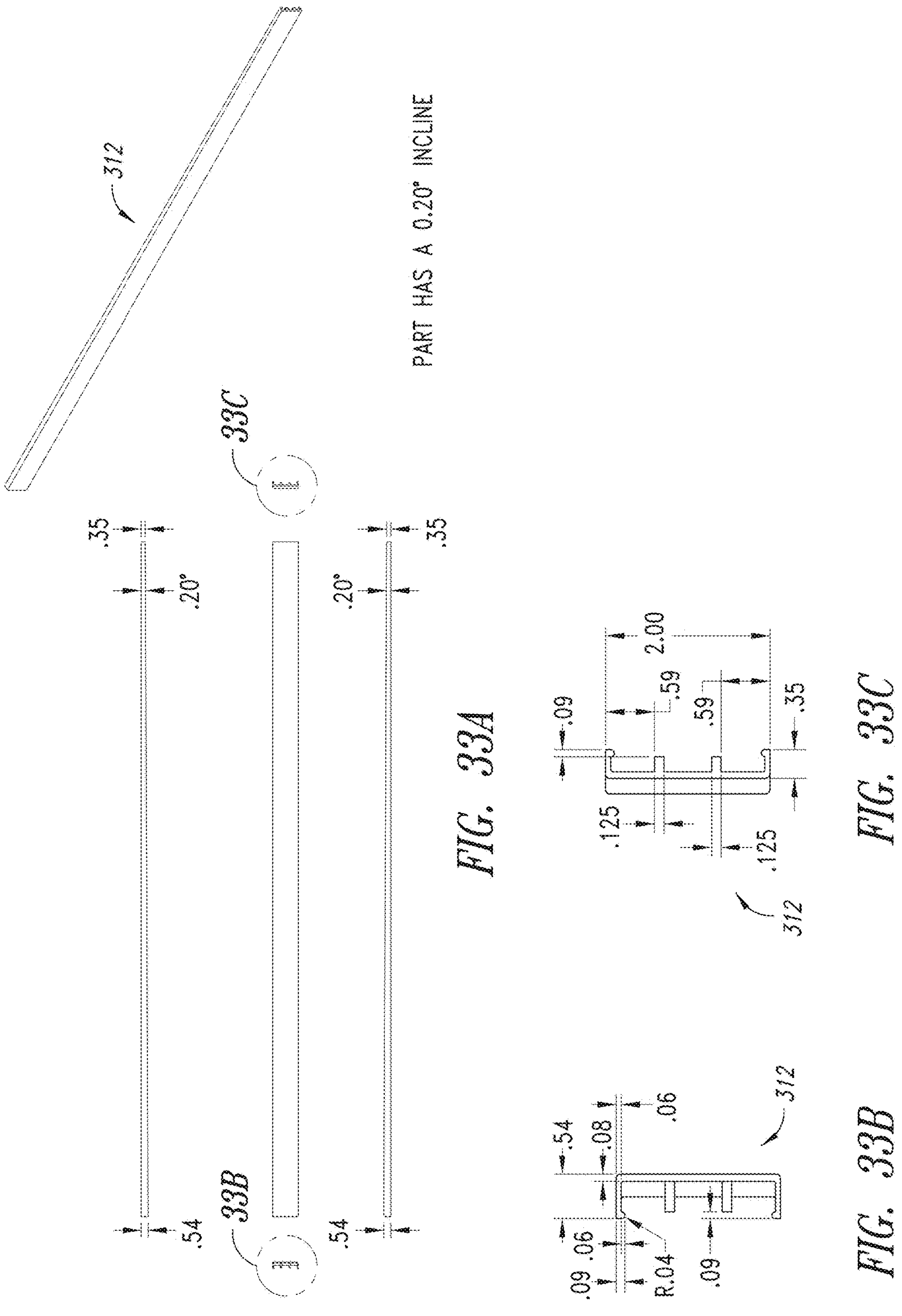
FIG. 33A shows various views of an example injection molded plastic frame wedge that mounts to a top horizontal frame of a top-hanging sliding door, according to one illustrated implementation.
FIG. 33B is a detailed view of a portion of FIG. 33A designated as detail 33B, according to one illustrated implementation.
FIG. 33C is a detailed view of a portion of FIG. 33A designated as detail 33C, according to one illustrated implementation.
Figures 34A, 34B, 34C:
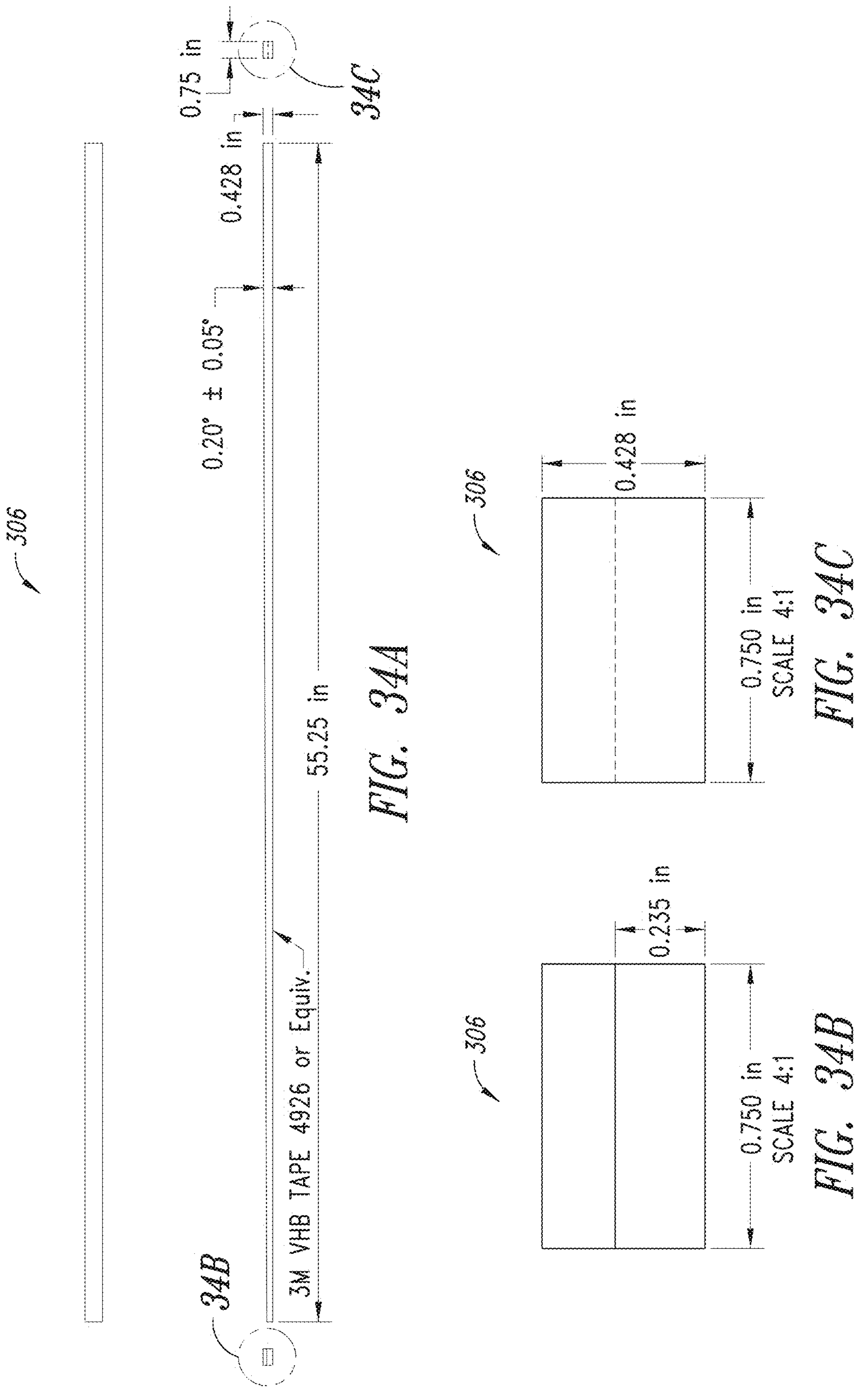
FIG. 34A shows various views of an injection molded foam door wedge that mounts to the top portion of a door panel via an adhesive backing, according to one illustrated implementation.
FIG. 34B is a detailed view of a portion of FIG. 34A designated as detail 34B, according to one illustrated implementation.
FIG. 34C is a detailed view of a portion of FIG. 34A designated as detail 34C, according to one illustrated implementation.

FIGS. 33A-33C show various views of an example injection molded plastic frame wedge that mounts to a top horizontal frame of a top-hanging sliding door. The example frame wedge of FIGS. 33A-C includes a 0.20 degree incline. FIGS. 34A-C show various views of an injection molded foam door wedge that mounts to the top portion of a door panel via an adhesive backing. As a non-limiting example, the adhesive backing may be 4926 very high bond (VHB) tape available from 3M Company, or may be any other suitable adhesive or fastener.

Figure 23:
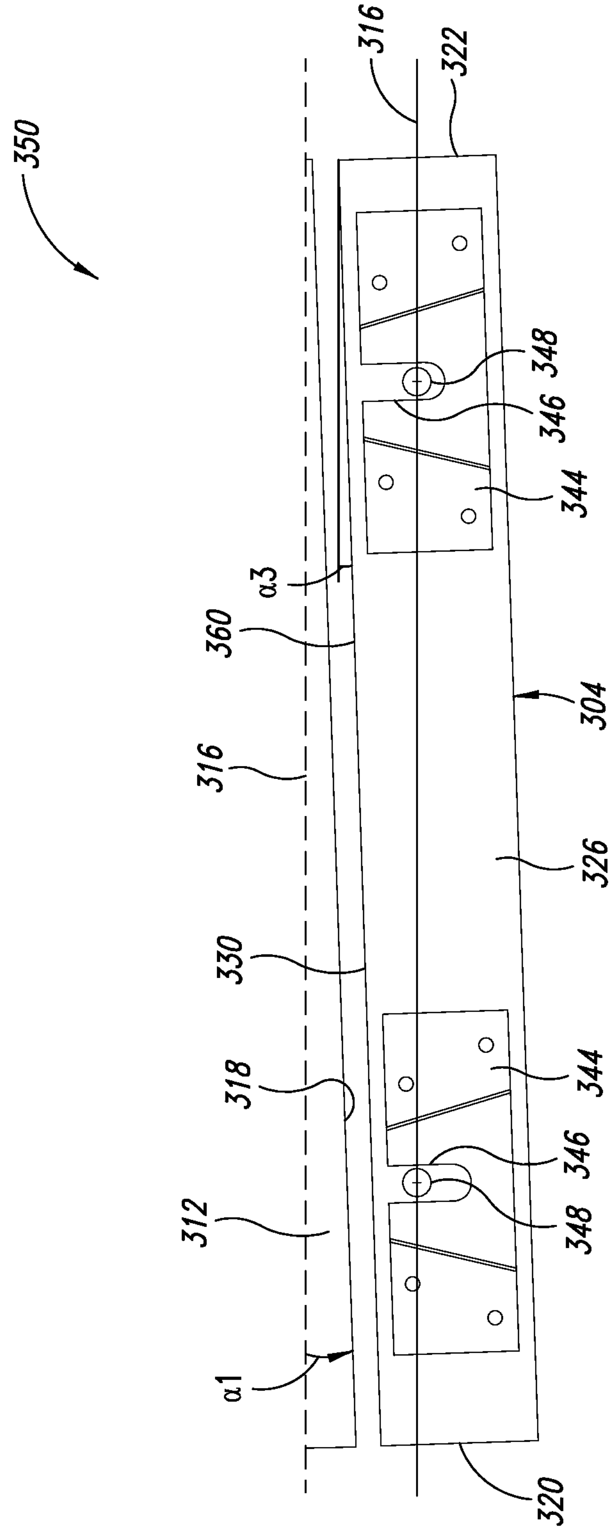
FIG. 23 is a top view of the top-hanging sliding door of FIG. 22A, showing the wedge top seal thereof, according to one illustrated implementation.
Figures 24A, 24B:
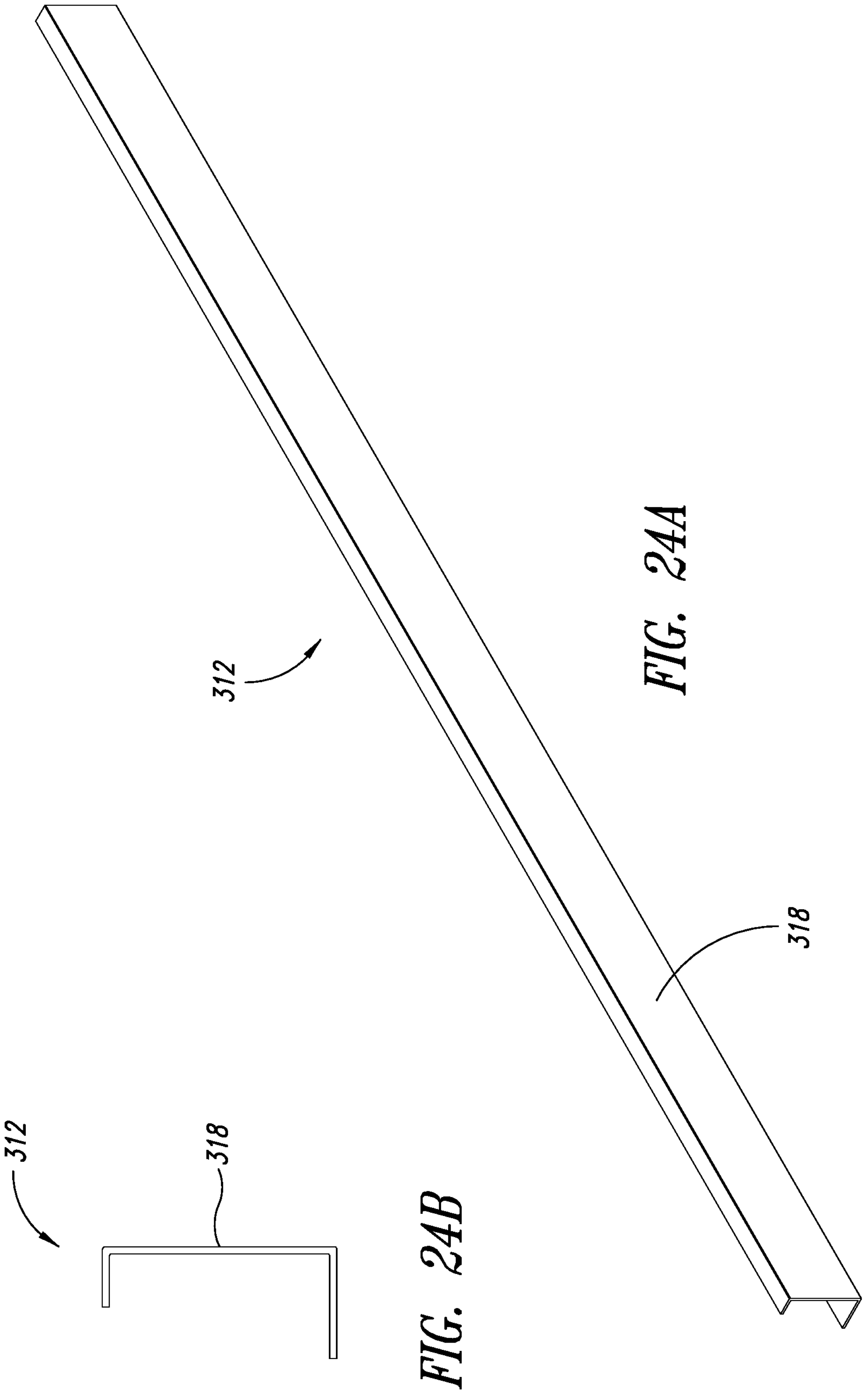
FIG. 24A is an isometric view of a frame wedge of the top-hanging sliding door of FIG. 22A, according to one illustrated implementation.
FIG. 24B is a sectional view of a frame wedge of the top-hanging sliding door of FIG. 22A, according to one illustrated implementation.
Figure 25A:
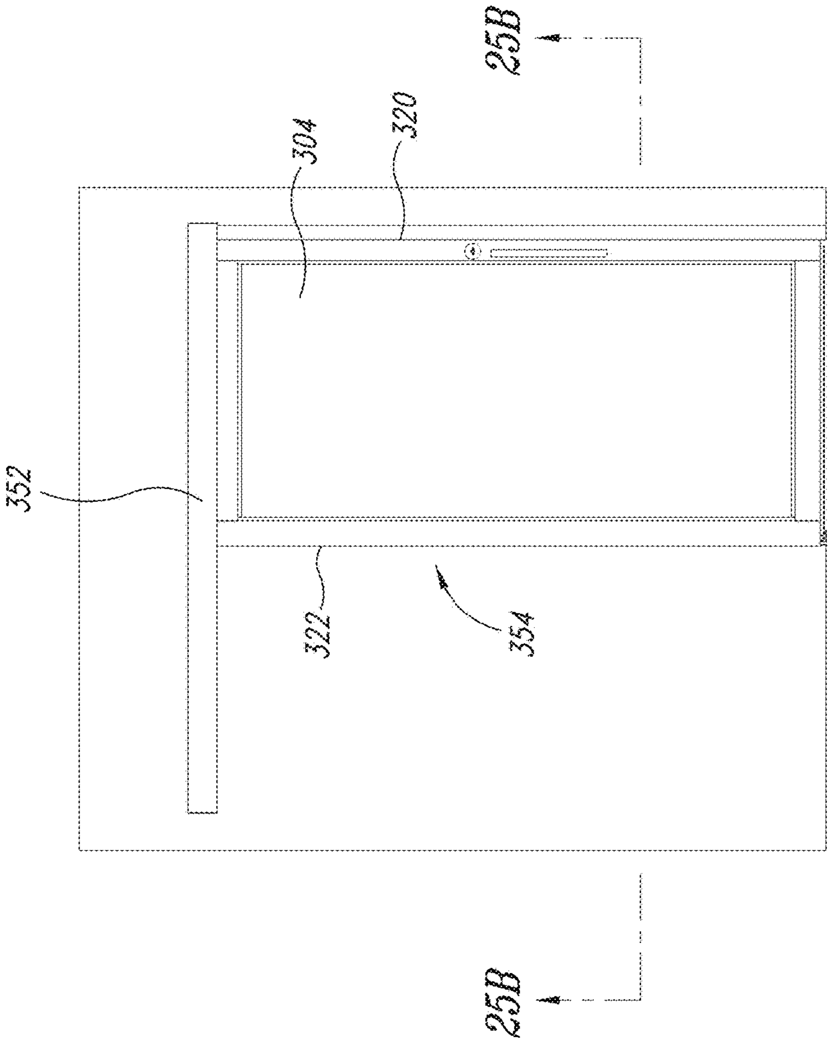
FIG. 25A is an elevational view of a top-hanging sliding door which includes at least one rear door wedge gasket or seal which provides a rear seal, according to one illustrated implementation.
Figure 25B:
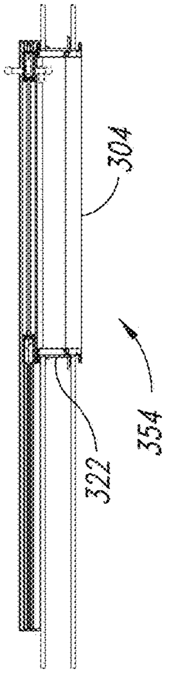
FIG. 25B is a sectional view of the top-hanging sliding door of FIG. 25A taken along the line 25B-25B of FIG. 25A, according to one illustrated implementation.
Figure 26:
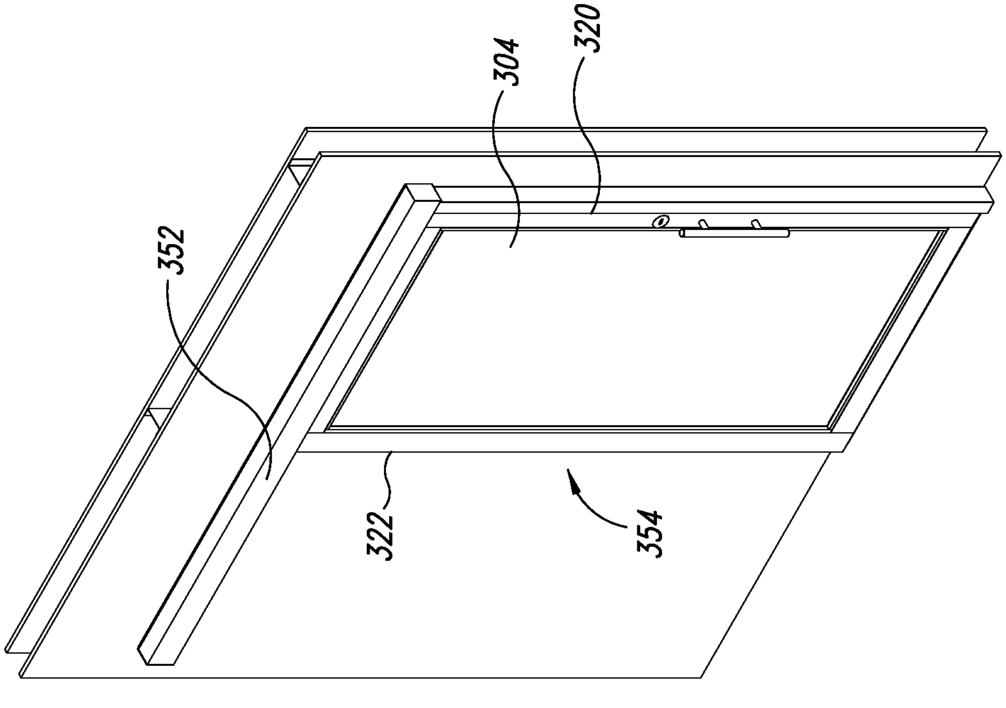
FIG. 26 is an isometric view of the top-hanging sliding door of FIG. 25A, according to one illustrated implementation.

FIGS. 22A-24 show various views of a second implementation of a top-hanging sliding door 350 that includes door sealing system which has a wedge design top seal with a frame wedge and an angled door panel 304. In this implementation, rather than providing two opposing angled seal surfaces 318 and 332, there is one angled surface 318 on the fixed frame wedge 312 and the sliding door panel 304 is adjusted to be in a reverse angled orientation such that the rear face 330 of the door panel is at least substantially parallel with the angled surface 318 of the frame wedge. As shown in FIG. 23, the sliding door panel 304 still moves in a direct parallel travel path along the track line 316. However, the door panel 304 is angled at a non-zero angle $\alpha_3$ such that the front or leading edge 320 of the door panel 304 is a greater distance away from the frame line and the back or trailing edge 322 is closer to the frame line. When closed, the angled door panel 304 mates with the angled frame wedge surface 318 of the frame wedge 312. Upon sliding the door panel 304 open, the angled mating surfaces 318 and 330 draw apart as the linear travel is progressed.

To achieve such functionality, on the top surface 326 of the door panel 304 there are two hanger brackets 344 from which the door panel is hung from the track (not shown). The hanger brackets 344 each have U-shaped slots 346 in them which receive suspension bolts 348 therein. During installation, the installer can adjust the angle $\alpha_3$ of the door panel 304 by adjusting the position of the suspension bolts 348 in the U-shaped slots 346. Advantageously, in this implementation there is no need for the door wedge 306 (FIG. 16) at the top of the door panel 304, since the door wedge surface in this implementation is provided by an upper portion of rear face 330 of the door panel 304 itself, which mates with the frame wedge surface 318 upon moving the door panel 304 from the open position to the closed position. Similar to the implementation discussed above, the mating surfaces 318 and 330 do not contact each other until just before the door panel 304 closes, such that the vast majority of slide travel is uninhibited by sliding friction.

In this implementation, a compression seal 360 (e.g., foam, gasket) may be positioned on the rear side 330 of the door panel 304 near the top thereof, such that the compression seal 360 contacts the frame wedge surface 318 of the frame wedge 312 when the door panel is moved into the closed position. In at least some implementations, the compression seal 360 may a layer of low durometer foam with a low friction coating disposed thereon. For example, the foam may be coupled to the door panel via a suitable adhesive.

Top-Hanging Sliding Doors Including Rear Seals

FIGS. 25A-32 show various views of seal designs which provide a seal at the back or rear vertical edge 322 of a sliding door panel 304. See FIGS. 25A, 25B and 26, which show various views of a sliding door 304, door frame 352, and location (indicated by arrows 354) of the rear seals of the present disclosure. In at least some implementations, the "rear seals" may be formed from an extruded elastomeric compound (e.g., a foam or a thin walled hollow extrusion). The seals may be adhered to the rear side 330 the door panel 304 proximate the trailing edge 322 via adhesive tape or other adhesive, or may slide into an extruded retainer (e.g., aluminum retainer, plastic retainer) which may be mounted to the door panel (or door frame) with screws or adhesive.

Figure 27:
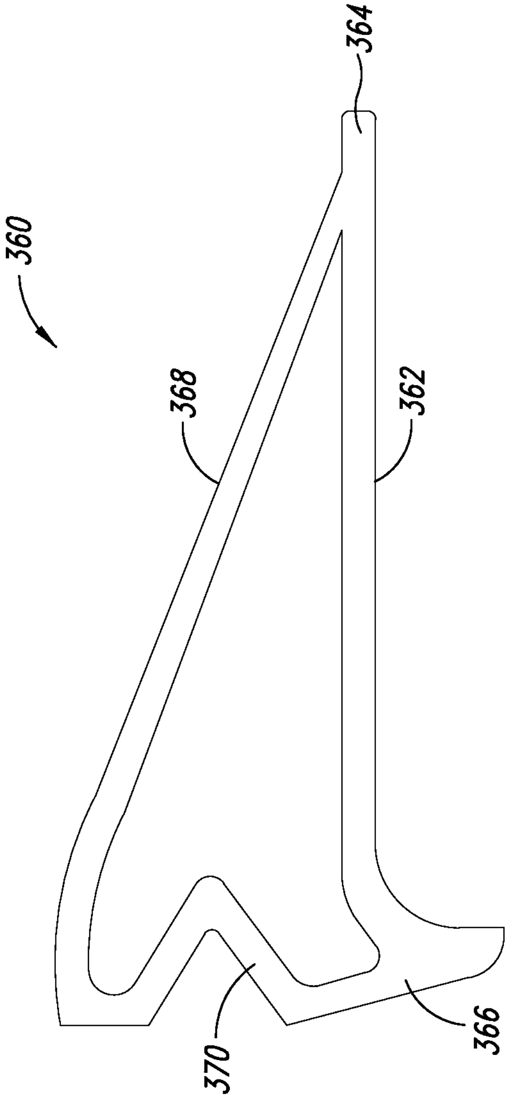
FIG. 27 is a sectional view of a rear door wedge seal of the top-hanging sliding door of FIG. 25A, according to one illustrated implementation.
Figure 28:
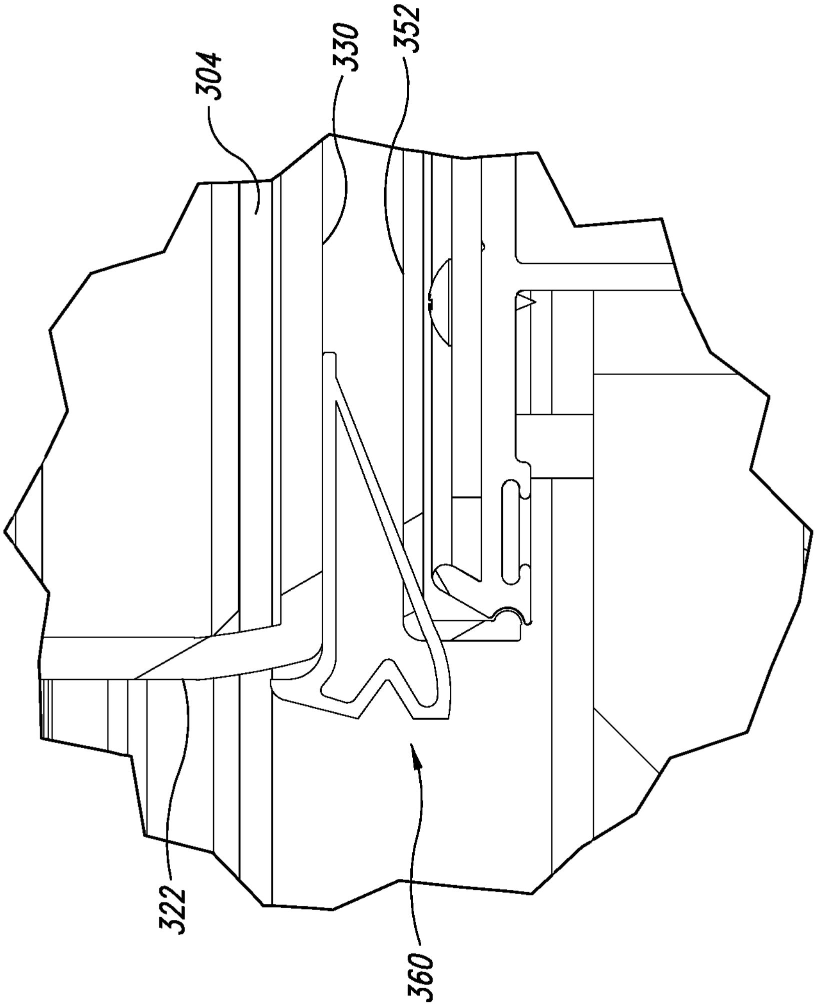
FIG. 28 is a sectional view of the rear door wedge seal of FIG. 27 shown installed on the top-hanging sliding door of FIG. 25A and providing a rear seal for the door, according to one illustrated implementation.

FIGS. 27 and 28 show a first example implementation of a rear seal 360. In this implementation, the rear seal 360 includes a planar portion 362 which is coupled (e.g., via an adhesive) to the rear side 330 of the door panel 304 proximate the trailing edge 322. The rear seal 360 may have a length which is similar or equal to the height of the door panel 304 so that a seal is provided between the door panel and a vertical portion of the door frame 352 along the entire rear vertical edge 322 of the door panel 304. In at least some implementations, the rear seal 360 is narrow at a leading edge 364 and tapers up to be wide at a back edge 366, so as to act as a wedge. The rear seal 360 is mounted onto the rear side 330 of the door panel 304 near the back vertical edge 322, so that a contact surface 368 of the rear seal 360 only comes into contact with the fixed door frame 352 at the very last portion of slide travel. The contact surface 368 may be coated with a friction reducing material, for example. It is noted that in FIG. 28 the rear seal 360 is shown as interfering with the door frame 352, but in reality the rear seal 360 would be engaged with the door frame and compressed thereby to form a seal between the door panel 304 and the vertical portion of the door frame 354 adjacent the rear vertical edge 322 of the door panel. The wedge design of the rear seal 360 transfers the horizontal sliding motion of the door panel 304 into a compressive force between the door panel and the door frame 352 when the door panel is nearly in the closed position. A v-shaped portion 370 of the of the rear seal 360 acts as a compression spring to provide the compressive force between the door panel 304 and the door frame 352 when the door panel is moved into the closed position. Advantageously, the rear seal 360 only engages the door frame 352 when the door panel 304 is nearly closed, such that the vast majority of slide travel is uninhibited by sliding friction. In the illustrated example, the rear seal 360 may have a length of 1.09 inches, and a height of 0.38 inches.

Figure 29:
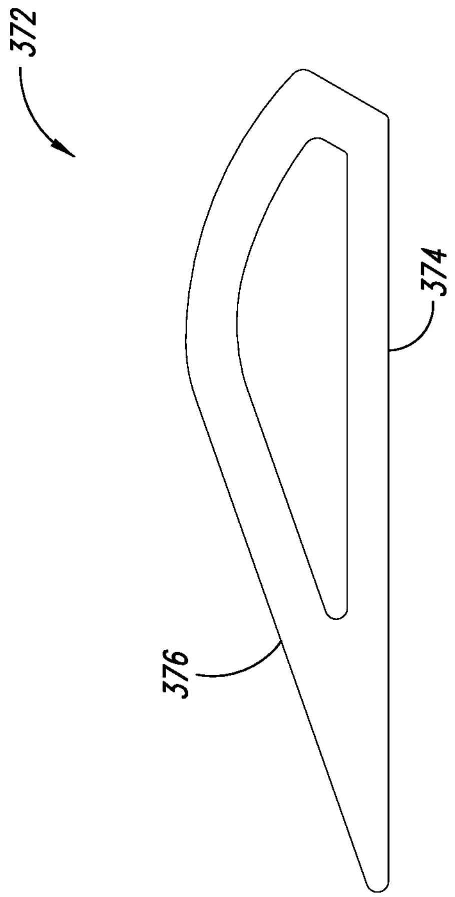
FIG. 29 is a sectional view of a rear door wedge seal of the top-hanging sliding door of FIG. 25A, according to one illustrated implementation.

FIGS. 29 and 30 show a second example implementation of a rear seal assembly. In this implementation, rather than one relatively high profile wedge-shaped rear seal mounted to the door panel 304, there are two half-height wedge-shaped rear seals 372 mounted in reverse orientation that come into contact with each other at the last portion of the travel of the door panel to engage each other and compress against each other. The advantage of two rear seals (as opposed to a single rear seal) is that the height of rear seal coupled to the door panel can be reduced so that it does not impact or collide with other frame components (e.g., adjacent window) during opening and closing of the door panel. In the illustrated example, the rear seals 372 each have a height of 0.19 inches, which is half the height of the rear seal 360 shown in FIG. 27.

Figure 30A:
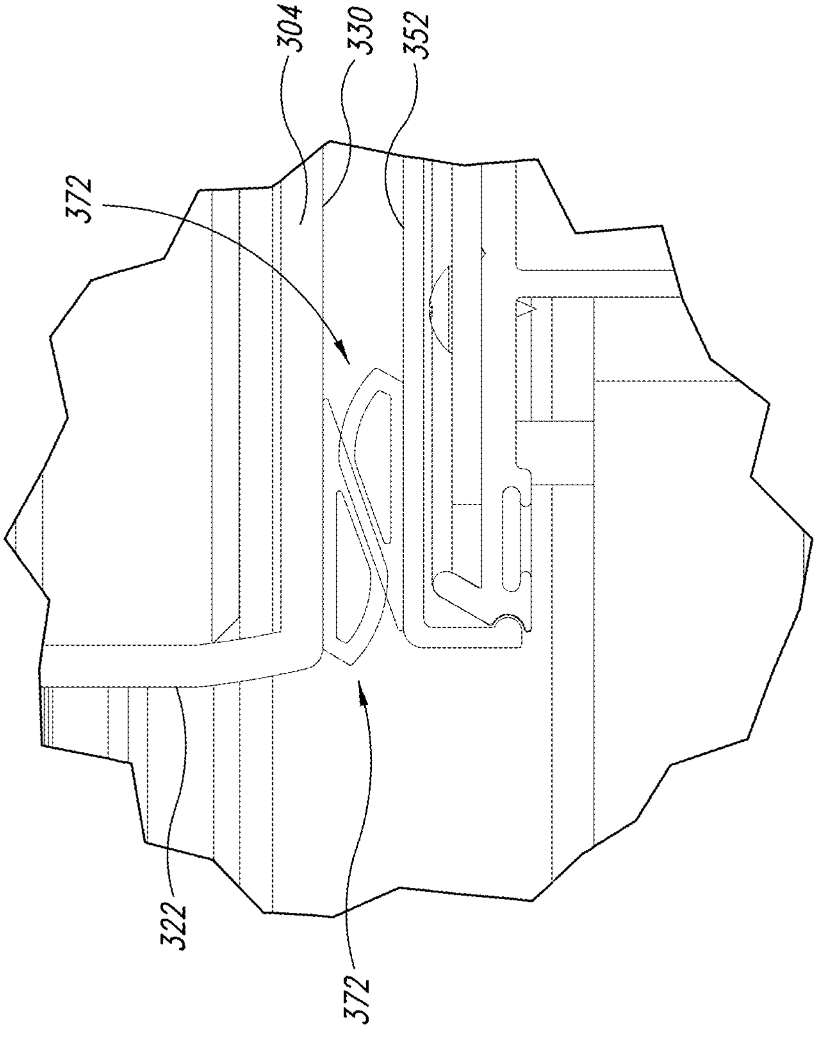
FIG. 30A is a sectional view of the rear door wedge seal of FIG. 29 shown installed on the top-hanging sliding door of FIG. 25A and providing a rear seal for the door, according to one illustrated implementation.

As shown in FIG. 29, each of the rear seals 372 includes a planar portion 374 which attaches to either the door panel 304 or the vertical portion of the door frame 352 proximate the trailing edge 322 via a suitable fastener (e.g., adhesive, retainer). Opposite the planar portion 374 is a ramped contact surface 376, which may be coated with a friction reducing material. As shown in FIG. 30A, the rear seals 372 are mounted in reverse orientation with respect to each other such that the contact surfaces 376 of each of the rear seals 372 contact each other and compress the rear seals together as the door panel 304 is moved into the closed position, thereby providing a seal between the door panel 304 and the door frame 352 along the rear or trailing vertical edge 322 of the door panel. The rear seals 372 may each have a length which is similar or equal to the height of the door panel 304 to provide a seal along the entire trailing edge 322 of the door panel 304.

Figure 30B:
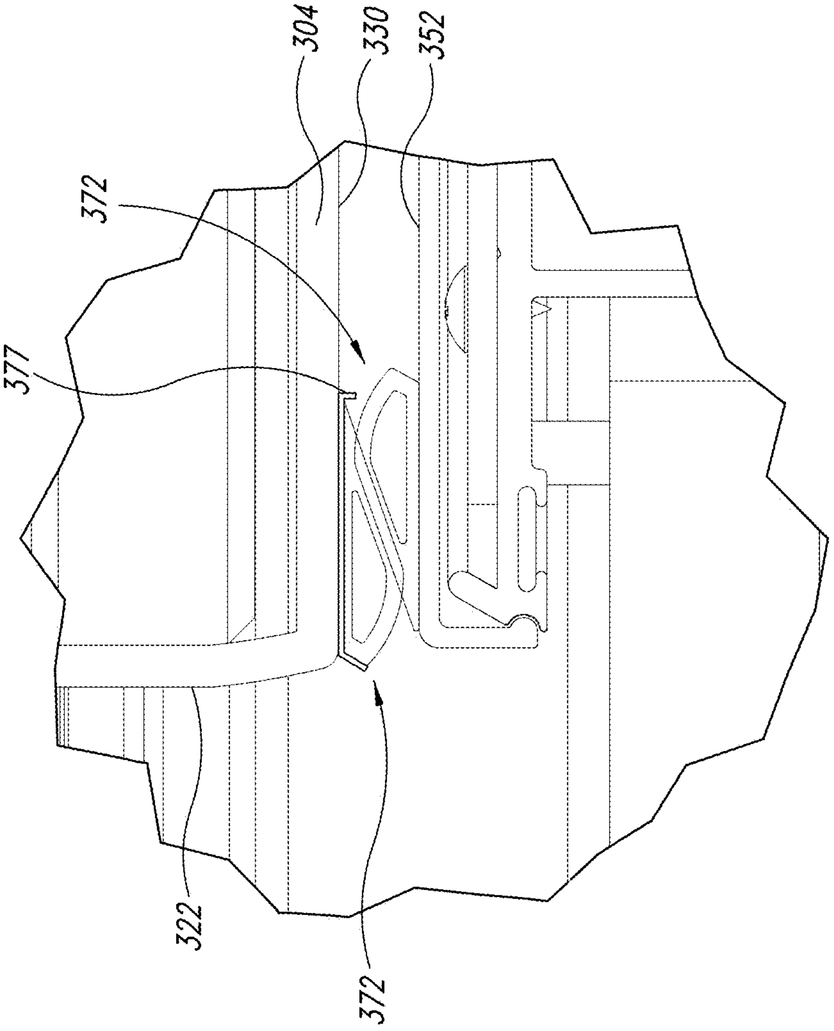
FIG. 30B is a sectional view of the rear door wedge seal of FIG. 29 shown installed on the top-hanging sliding door of FIG. 25A by way of a retainer and providing a rear seal for the door, according to one illustrated implementation.

An alternative embodiment is shown in FIG. 30B, in which the rear seals 372 are mounted to the rear side 330 of the door panel 304 by way of a retainer 377. The retainer 377 is coupled to the rear side 330 of the door panel 304.

Figure 31:
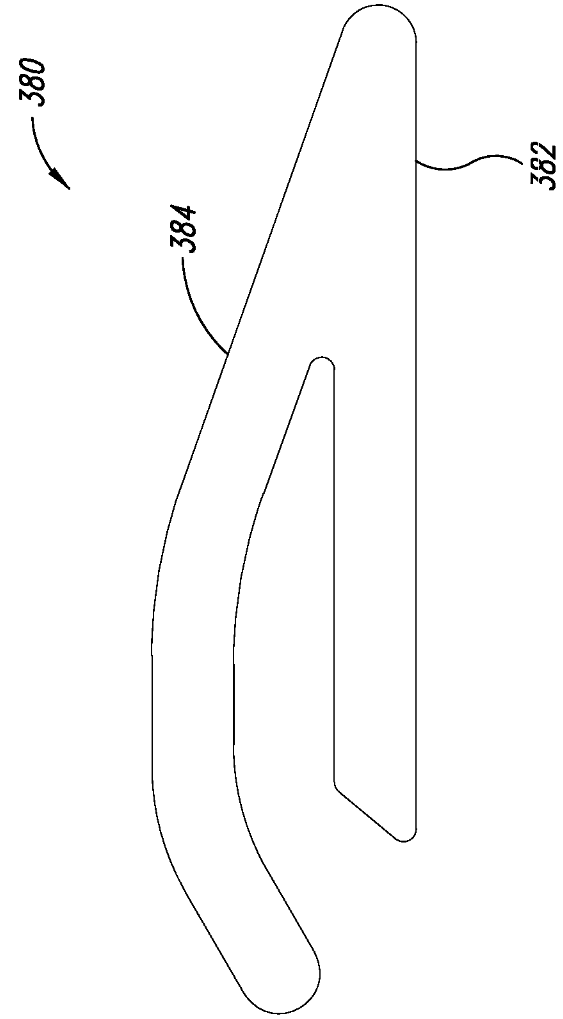
FIG. 31 is a sectional view of a rear door wedge seal of the top-hanging sliding door of FIG. 25A, according to one illustrated implementation.
Figure 32:
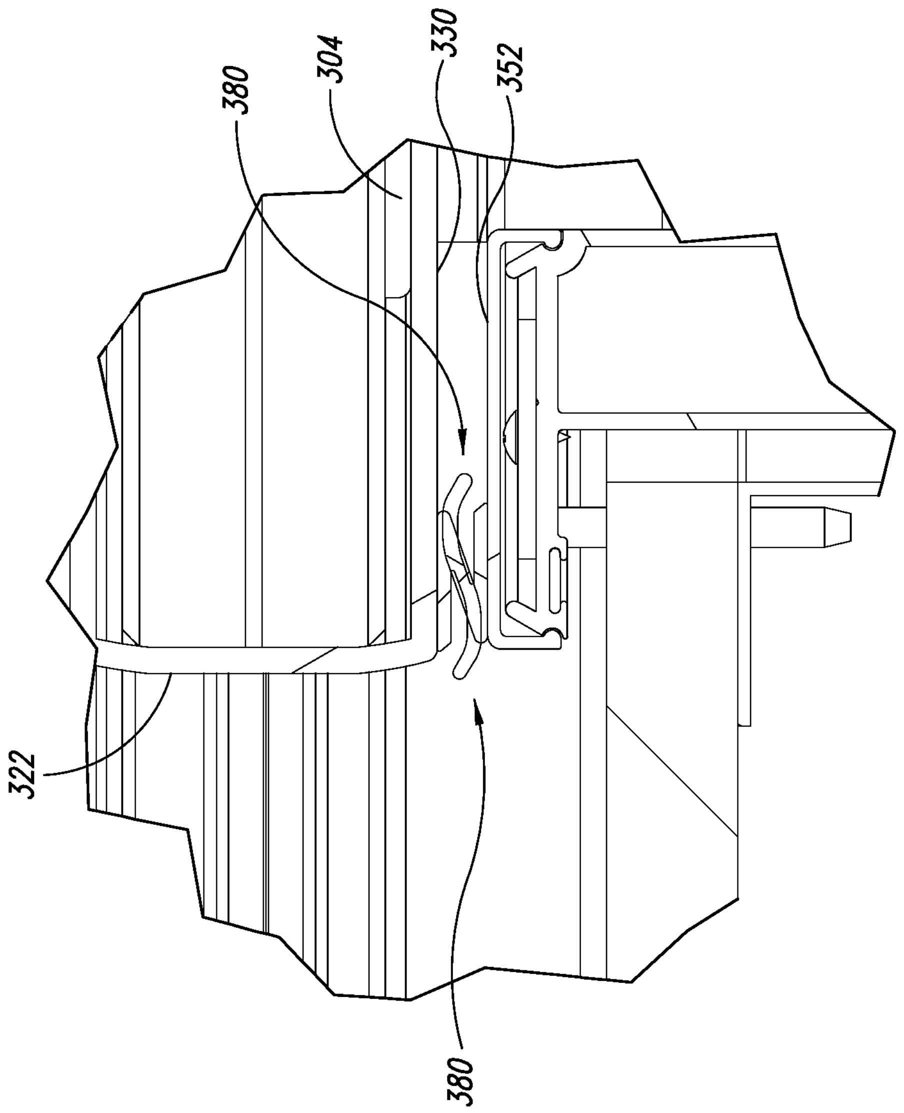
FIG. 32 is a sectional view of the rear door wedge seal of FIG. 31 shown installed on the top-hanging sliding door of FIG. 25A and providing a rear seal for the door, according to one illustrated implementation.

FIGS. 31 and 32 show a third example implementation of a rear seal assembly. This implementation is similar to the implementation shown in FIGS. 29 and 30 in many respects. For example, in this implementation, rather than one high profile wedge rear seal mounted to the door panel, as shown in FIGS. 27 and 28, there are two half-height wedge-shaped rear seals 380 mounted in reverse orientation that come into contact with each other at the last portion of the travel of the door panel 304 to engage each other and compress against each other. As shown in FIG. 31, instead of being closed extrusions having a hollow openings therein, each of the rear seals 380 is generally v-shaped and includes a planar portion 382 which attaches to either the door panel 304 or the door frame 352 via a suitable fastener (e.g., adhesive, retainer). Opposite the planar portion 382 is a ramped contact surface 384, which may be coated with a friction reducing material. As shown in FIG. 32, the rear seals 380 are mounted in reverse orientation with respect to each other such that the contact surfaces 384 of each of the rear seals contact each other and compress the rear seals as the door panel 304 is moved into the closed position, thereby providing a seal between the door panel 304 and the door frame 352 along the rear or trailing vertical edge 322 of the door panel. The rear seals 380 may each have a length which is similar or equal to the height of the door panel 304 to provide a seal along the entire trailing edge 322 of the door panel 304.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of various implementations. Those of skill in the art will recognize that many of the examples set out herein may employ additional elements and/or may omit some elements. The various implementations described above can be combined to provide further implementations.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/442,623, filed Jan. 5, 2017 and U.S. Provisional Patent Application No. 62/480,946, filed Apr. 3, 2017, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A door seal system for a top-hanging sliding door, the top-hanging sliding door comprising a door frame which supports a door panel that is slideable along a track along an entirety of a length between an open position and a closed position without any pivoting motion, the door seal system comprising:

a frame wedge surface which faces outward from a top portion of the door frame toward the door panel, the frame wedge surface positioned to at least substantially horizontally align with a width of the door panel when the door panel is in the closed position, the frame wedge surface planar in shape and extending outward toward the door panel a first distance from a surface of the door frame fore of a trailing edge of the door panel and extending outward toward the door panel a second distance from the surface of the door frame proximate the trailing edge of the door panel, the first distance greater than the second distance, such that the frame wedge surface extends substantially parallel to a track axis of the track;

a door wedge surface which extends outward from a top portion of the door panel toward the frame wedge surface, the door wedge surface at least substantially parallel to the frame wedge surface such that as the door panel is moved from the open position to the closed position the door wedge surface engages the frame wedge surface to provide a seal therebetween;

a first rear seal coupled along a rear side of the door panel facing the door frame, the first rear seal extending between a bottom portion of the door panel and the top portion of the door panel; and a second rear seal coupled along a front side of the door frame facing the door panel, the second rear seal extending between a bottom portion of the door frame and the top portion of the door frame, wherein the surface of the door frame extends in a direction parallel to the width of the door panel, and wherein as the door panel is moved from the open position to the closed position the first rear seal engages the second rear seal to provide a seal therebetween.

2. A top-hanging sliding door, comprising:

a door frame;

a door panel supported by the door frame, the door panel slideable along an entirety of a length between an open position and a closed position without any pivoting motion; and a door seal system comprising:

a frame wedge surface which faces outward from a top portion of the door frame toward the door panel, the frame wedge surface positioned to at least substantially horizontally align with a width of the door panel when the door panel is in the closed position, the frame wedge surface planar in shape and extending outward toward the door panel a first distance from a surface of the door frame fore of a trailing edge of the door panel and extending outward toward the door panel a second distance from the surface of the door frame proximate the trailing edge of the door panel, the first distance greater than the second distance, such that the frame wedge surface extends substantially parallel to a track axis of the track; and a door wedge surface which extends outward from a top portion of the door panel toward the frame wedge surface, the door wedge surface at least substantially parallel to the frame wedge surface such that as the door panel is moved from the open position to the closed position the door wedge surface engages the frame wedge surface to provide a seal therebetween, wherein the surface of the door frame extends in a direction parallel to the width of the door panel;

a first rear seal coupled along a rear side of the door panel facing the door frame, the first rear seal extending between a bottom portion of the door panel and the top portion of the door panel; and a second rear seal coupled along a front side of the door frame facing the door panel, the second rear seal extending between a bottom portion of the door frame and the top portion of the door frame, wherein as the door panel is moved from the open position to the closed position the first rear seal engages the second rear seal to provide a seal therebetween.

3. The top-hanging sliding door of claim 2 wherein the door panel is hung at a non-zero angle with respect to the track axis of the track.

4. The top-hanging sliding door of claim 3 wherein the door panel is hung at an angle between 0.1 degrees and 4.0 degrees with respect to the track axis of the track.

5. The top-hanging sliding door of claim 2 wherein the frame wedge surface extends at an between 0.1 degrees and 4.0 degrees with respect to the track axis of the track.

6. The top-hanging sliding door of claim 2 wherein the door wedge surface comprises a door wedge coupled to a top portion of the door panel, the door wedge surface extending outward from the top portion of the door panel toward the frame wedge surface a third distance proximate a leading edge of the door panel and extending outward from the top portion of the door panel toward the frame wedge surface a fourth distance proximate a trailing edge of the door panel, the fourth distance greater than the third distance, such that the door wedge surface extends at a non-zero angle with respect to the track axis of the track.

7. The top-hanging sliding door of claim 2 wherein at least one of the frame wedge surface and the door wedge surface includes a friction-reducing material thereon.

8. The top-hanging sliding door of claim 2 wherein the door wedge surface comprises a door wedge selectively coupled to a top portion of the door panel, the door wedge including a pivot hole proximate a leading edge of the door panel and an angle adjustment slot proximate the trailing edge of the door panel.

9. The top-hanging sliding door of claim 8 wherein the door wedge is selectively coupleable to the top portion of the door panel via first and second fasteners that are insertable into the door panel through the pivot hole and the angle adjustment slot, respectively.

10. The top-hanging sliding door of claim 2 wherein the frame wedge surface and the door wedge surface are configured to form a compressive seal therebetween.

11. The top-hanging sliding door of claim 2 wherein the first rear seal is coupled to the rear side of the door panel via an adhesive.

12. The top-hanging sliding door of claim 2 wherein the first rear seal is coupled to a retainer which is coupled to the rear side of the door panel.

13. The top-hanging sliding door of claim 2 wherein the first rear seal comprises at least one of an extruded elastomeric compound.

14. The top-hanging sliding door of claim 2 wherein the first rear seal is relatively narrow toward a front edge opposite the trailing edge of the door panel and is relatively wide toward a rear edge relatively proximate the trailing edge of the door panel.

15. The top-hanging sliding door of claim 2 wherein at least a portion of the first rear seal includes a friction-reducing surface.

16. The top-hanging sliding door of claim 2 wherein the bottom portion of the door panel has a downward facing opening therein, the door seal system further comprising:

a drop seal assembly physically coupled to the bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position.

17. The top-hanging sliding door of claim 2 wherein the first rear seal and the second rear seal have a substantially identical cross-section.

18. The top-hanging sliding door of claim 2 wherein the first rear seal is relatively narrow toward a front edge opposite the trailing edge of the door panel and is relatively wide toward a rear edge relatively proximate the trailing edge of the door panel, and the second rear seal is relatively wide toward a front edge opposite the trailing edge of the door panel and is relatively narrow toward a rear edge relatively proximate the trailing edge of the door panel.

19. The top-hanging sliding door of claim 18 wherein the first rear seal and second rear seal include respective ramped surfaces which engage each other to provide a seal therebetween.

20. The top-hanging sliding door of claim 2 wherein the door panel comprises a bottom portion having a downward facing opening therein, the door seal system further comprising:

a drop seal assembly physically coupled to the bottom portion of the door panel, the drop seal assembly including an elongated carriage having an elastic seal disposed on a bottom side thereof which faces a floor surface below the door panel, the carriage vertically movable between a raised position wherein the elastic seal is spaced apart from the floor surface, and a lowered position wherein the elastic seal is in contact with the floor surface, and the carriage is biased in the raised position and vertically movable from the raised position to the lowered position responsive to an external horizontal force applied to the carriage; and a drop seal assembly activator physically coupled to the door frame of the top-hanging sliding door, in operation the drop seal assembly activator imparts the horizontal force on the carriage as the door panel is moved from the open position toward the closed position to cause the carriage of the drop seal assembly to move from the raised position to the lowered position.

21. The top-hanging sliding door of claim 20 wherein the carriage of the drop seal assembly comprises a fixed pin, and the drop seal assembly further comprises an elongated guide bar which is fixed relative to the door panel, the guide bar includes an angled slot therein which receives the fixed pin of the carriage, and the fixed pin rides in the angled slot responsive to the horizontal force imparted on the carriage by the drop seal assembly activator to control movement of the carriage between the raised position and the lowered position.

22. The top-hanging sliding door of claim 21 wherein the drop seal assembly further comprises at least one spring coupled between the elongated guide bar and the carriage, the at least one spring biases the carriage in the raised position.

23. The top-hanging sliding door of claim 21 wherein the angled slot of the elongated guide bar is disposed at an angle that is between 30 degrees and 45 degrees with respect to horizontal.

24. The top-hanging sliding door of claim 20 wherein the drop seal assembly further comprises a bearing coupled to the carriage proximate a trailing end of the door panel, and the drop seal assembly activator comprises a sill guide which has a bearing surface which contacts the bearing when the door panel is moved from the open position to the closed position.

25. The top-hanging sliding door of claim 24 wherein the horizontal position of the bearing surface of the sill guide is selectively adjustable and the horizontal position of the bearing surface of the sill guide controls the height of the carriage when the carriage is in the lowered position.

26. The top-hanging sliding door of claim 20 wherein the drop seal assembly activator is self-adjusting to cause the elastic seal to contact the floor surface below the door panel when the door panel is in the closed position when the floor surface is spaced apart from the bottom portion of the door panel by any distance within a determined range of distances.

27. The top-hanging sliding door of claim 20 wherein the drop seal assembly comprises a first magnet coupled to a leading end of the carriage, and the drop seal assembly activator comprises a second magnet coupled to the door frame, and when the door panel is moved from the open position toward the closed position the second magnet repels the first magnet which imparts the horizontal force to the carriage of the drop seal assembly to cause the carriage to move from the raised position to the lowered position.

28. The top-hanging sliding door of claim 27 wherein when the door panel is in the closed position, the first magnet is spaced apart from the second magnet by an air gap.

* * * * *